(12) United States Patent
Song et al.

(10) Patent No.: US 11,501,578 B2
(45) Date of Patent: *Nov. 15, 2022

(54) DIFFERENTIATING A RENDERED CONFERENCE PARTICIPANT FROM A GENUINE CONFERENCE PARTICIPANT

(71) Applicant: Plantronics, Inc., Santa Cruz, CA (US)

(72) Inventors: Hailin Song, Beijing (CN); Hai Xu, Beijing (CN); Xi Lu, Beijing (CN); Fangpo Xu, Beijing (CN)

(73) Assignee: Plantronics, Inc., Santa Cruz, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/316,143

(22) Filed: May 10, 2021

(65) Prior Publication Data

US 2021/0271911 A1 Sep. 2, 2021

Related U.S. Application Data

(63) Continuation of application No. 16/943,490, filed on Jul. 30, 2020, now Pat. No. 11,042,767.

(30) Foreign Application Priority Data

Aug. 1, 2019 (CN) .......................... 201910706647.9

(51) Int. Cl.
| | | |
|---|---|---|
| *G06V 40/40* | (2022.01) | |
| *H04N 7/15* | (2006.01) | |
| *H04N 5/232* | (2006.01) | |
| *G06V 40/16* | (2022.01) | |

(52) U.S. Cl.
CPC ............ *G06V 40/40* (2022.01); *G06V 40/165* (2022.01); *G06V 40/171* (2022.01); *H04N 5/23238* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 2005/0031195 A1* | 2/2005 | Liu ...................... | G06V 40/169 |
| | | | 345/582 |
| 2006/0078172 A1* | 4/2006 | Zhang .................. | G06V 40/168 |
| | | | 382/118 |
| 2007/0019882 A1* | 1/2007 | Tanaka ................... | G06T 17/20 |
| | | | 382/276 |
| 2013/0127827 A1 | 5/2013 | Shiell et al. | |
| 2015/0009277 A1 | 1/2015 | Kuster et al. | |
| 2015/0213305 A1 | 7/2015 | Sundstrom | |
| 2016/0148427 A1* | 5/2016 | Tena ....................... | G06T 19/20 |
| | | | 345/419 |
| 2018/0020201 A1 | 1/2018 | Motta et al. | |
| 2019/0005359 A1 | 1/2019 | Wilf et al. | |
| 2019/0122404 A1* | 4/2019 | Freeman .............. | G06V 40/171 |
| 2021/0019912 A1 | 1/2021 | Cutler | |

* cited by examiner

*Primary Examiner* — Phung-Hoang J Nguyen
(74) *Attorney, Agent, or Firm* — Ramey LLP; Jacob B. Henry

(57) ABSTRACT

A videoconferencing device at an endpoint determines whether a person is a real person standing in front of a display device or if the person is instead an image rendered by a display device. In the first instance the real person will be included in a video feed for transmission to a remote endpoint. In the second instance, images of the display device on which the person is rendered will not be included in the video feed.

20 Claims, 12 Drawing Sheets

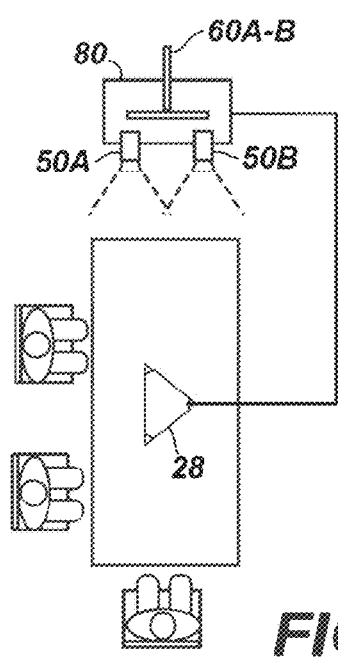
FIG. 1C
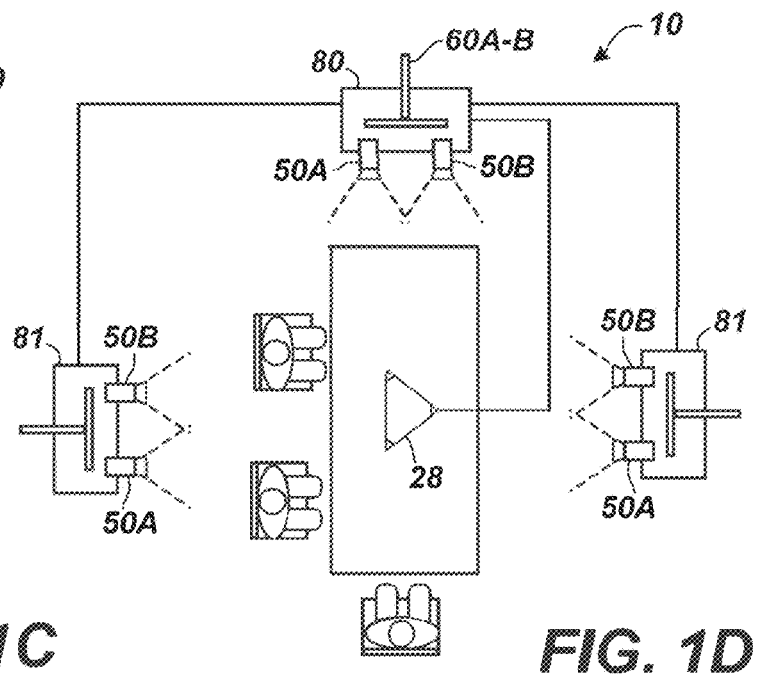
FIG. 1D
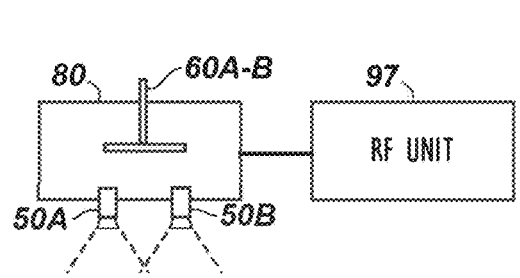
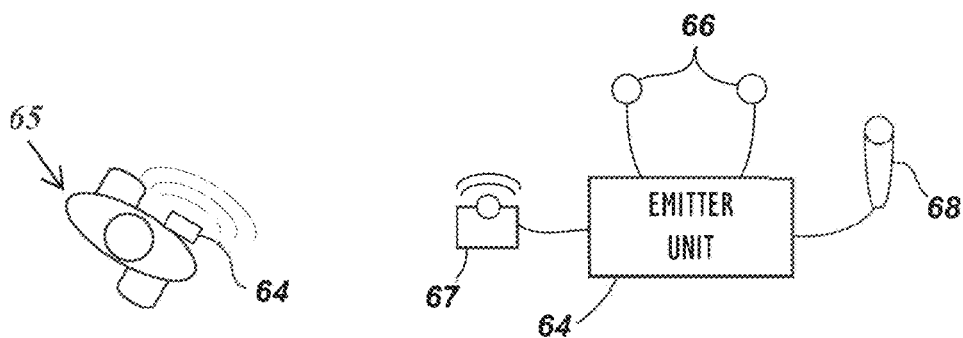
FIG. 1E

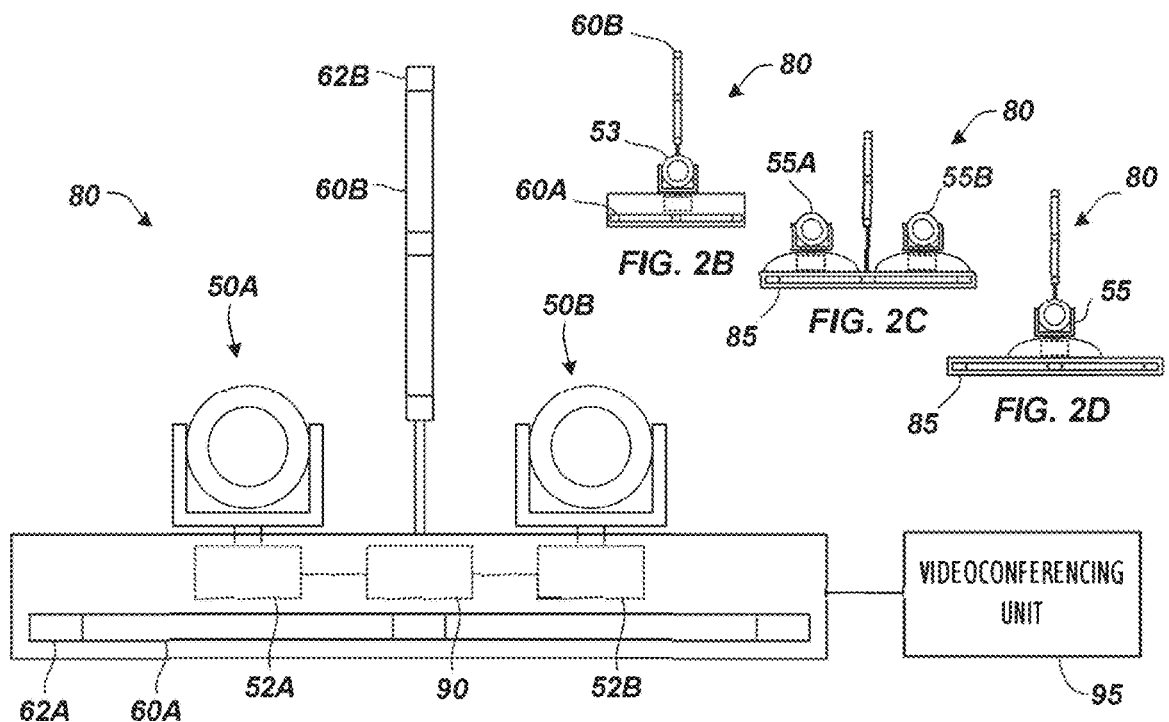
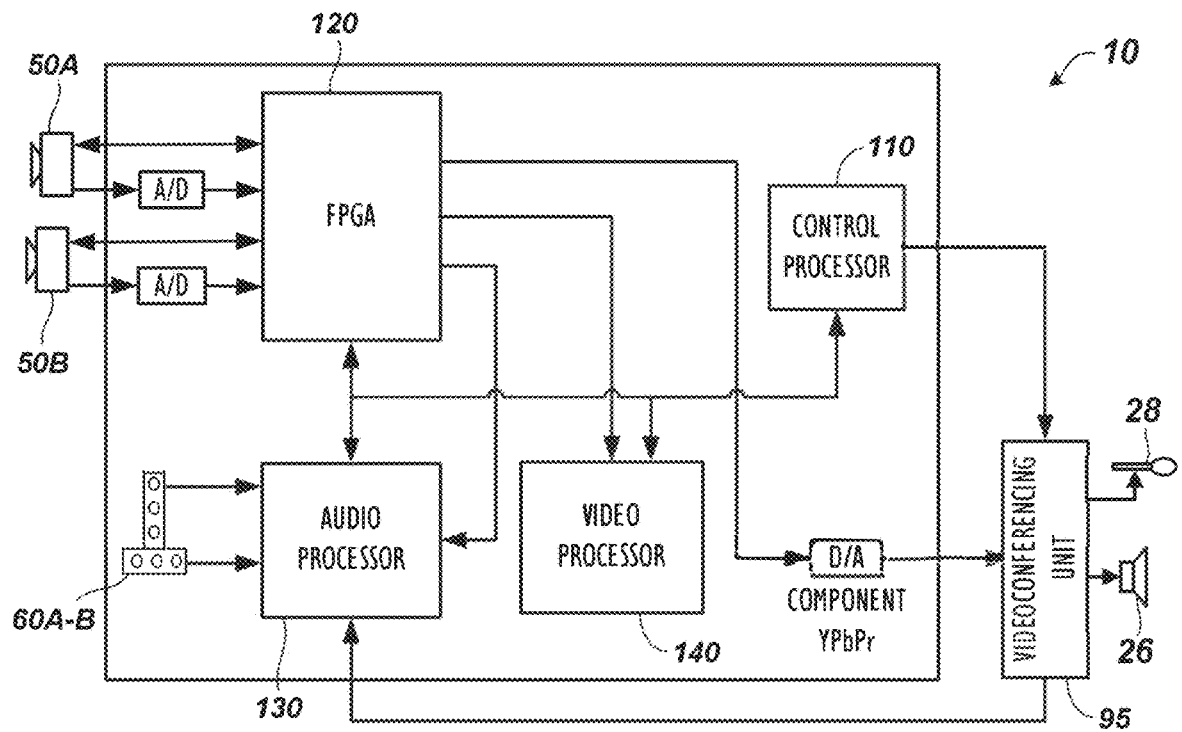

DIFFERENTIATING A RENDERED CONFERENCE PARTICIPANT FROM A GENUINE CONFERENCE PARTICIPANT

CROSS-REFERENCE TO RELATED APPLICATION

This application is a continuation of U.S. application Ser. No. 16/943,490, filed on Jul. 30, 2020, entitled DETECTING SPOOFING TALKER IN A VIDEOCONFERENCE, which claims priority to CN Application No. 201910706647.9, filed on Aug. 1, 2019, both of which applications are fully incorporated by reference herein.

TECHNICAL FIELD

This disclosure relates generally to videoconferencing and relates particularly to accurately discerning between conference participants and images of personnel rendered by electronic displays.

BACKGROUND

During a videoconference, people at a videoconferencing endpoint interact with people at one or more other videoconferencing endpoints. There exist systems which zoom in on a person who is currently talking, for people at another endpoint. There can, however, be television monitors or other electronic displays at one or more videoconferencing endpoints which themselves can get captured by a camera at the videoconferencing endpoint at which a television monitor or other electronic display is located. Such electronic displays can render images of people. Attempts to focus on real participants—while minimizing the chances of treating an image displayed on an electronic display as though the image were a participant—have not been wholly satisfactory. Thus, there is room for improvement in the art.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings:

FIGS. 1C-1E are plan views of videoconferencing endpoints, in accordance with examples of this disclosure.

FIG. 2A illustrates a videoconferencing device, in accordance with an example of this disclosure.

FIGS. 2B-2D show alternate configurations of the videoconferencing device of FIG. 2A.

FIG. 3 illustrates aspects of the videoconferencing device of FIGS. 2A-2D.

DETAILED DESCRIPTION

Figure 1A:
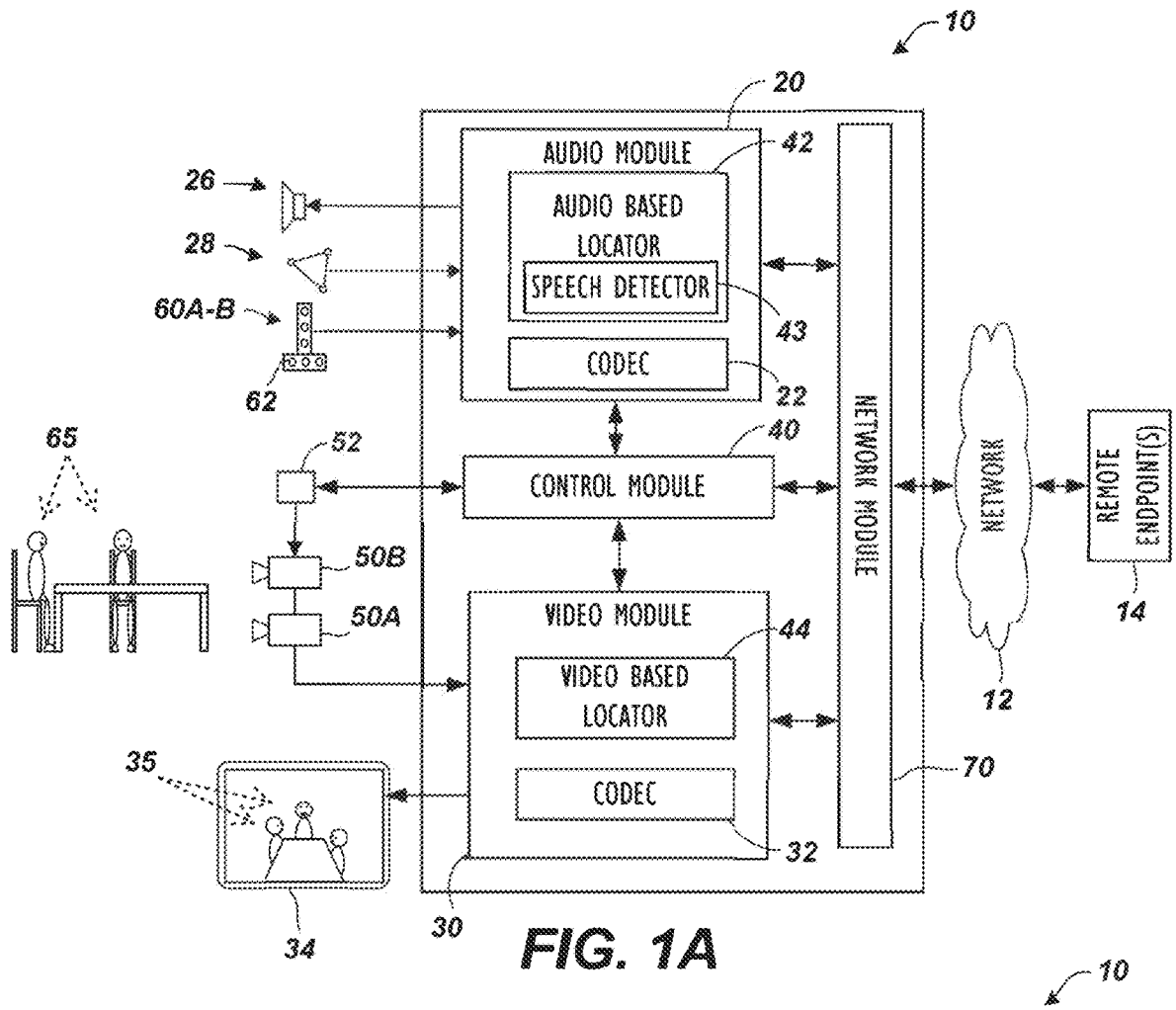
FIG. 1A illustrates a videoconferencing endpoint in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

INTRODUCTION

Terms used in this disclosure are used in the same sense as used by persons of skill in the art to which this disclosure belongs.

A polygon is a plane figure that is described by a finite number of straight-line segments connected to form a closed polygonal chain or polygonal circuit. The solid plane region, the bounding circuit, or the two together, may be called a polygon. The segments of a polygonal circuit are called its edges or sides, and the points where two edges meet are the polygon's vertices (singular: vertex) or corners.

A plane is a flat, two-dimensional surface that extends infinitely far. A plane is the two-dimensional analogue of a point (zero dimensions), a line (one dimension) and three-dimensional space.

Parallel lines are lines in a plane which do not meet; that is, two lines in a plane that do not intersect or touch each other at any point are said to be parallel. A line and a plane, or two planes, in three-dimensional Euclidean space that do not share a point are parallel. Two lines in three-dimensional space which do not meet must be in a common plane to be considered parallel. Parallel planes are planes in the same three-dimensional space that never meet.

An active talker is a person who is participating in a videoconference and is currently talking or who was recently talking.

Stereoscopy (also called stereoscopics, or stereo imaging) is a technique for creating or enhancing the illusion of depth in an image by means of stereopsis for binocular vision. A stereoscopic image can be called a stereogram.

Discussion

In at least one example of this disclosure, a videoconferencing device can detect and focus on an active talker. One or more microphone arrays can be used to determine the direction from the videoconferencing device to the active talker. In one or more examples of this disclosure, one or more cameras are used to locate the face of an active talker. Based on the direction and the location, a view of the active talker can be captured for transmission to another endpoint and the active talker can be tracked during a videoconference.

If, during a teleconference, there is television or monitor displaying video with people speaking in it, both voices and faces can be detected. In at least one example of this disclosure, a videoconferencing unit is configured to distinguish between faces on monitors and faces of real active talkers present near the videoconferencing unit. For ease of discussion and understanding, the phenomena of undesirably treating a displayed image as though it were a real person is called "spoofing." An example of this disclosure is a method to detect spoofing. A spoofed talker can also be known as a spoofed face/talker, a spurious face/talker or a non-genuine face/talker. At least one example of this disclosure is a method of distinguishing between real talkers and spurious talkers. Within this disclosure, a spurious talker, face or person refers to an image of a talker, face or person that is rendered on an electronic display and whose rendering on such electronic display is captured by one or more optical capture devices, such as one or more cameras.

In at least one example of this disclosure, checks are performed to determine the presence of one or more monitors at a videoconferencing endpoint which are being captured by one or more cameras. A monitor can correspond to a polygon. Checks for presence of electronic displays within camera view will be performed from time to time during a video conference. In at least one example, a camera with a panoramic view can be used to determine the location of an electronic monitor. In at least one example of this disclosure, only those faces that are determined to correspond to polygonal regions such that those faces could, in fact, be mere displayed images, are analyzed for possible spoofing. If a facial region does not overlap a region within a polygon, then then the face corresponding to that facial region is not being displayed on an electronic display. (It is noted for completeness that non-moving facial data—such as would correspond to a photograph or other still image—will also be de-selected.)

In at least one example of this application, (moving) faces that are at least partially bounded by polygons such as formed by the frame of an electronic display are scored. The score is proportional to the likelihood that the camera has captured facial data corresponding to a real person. If the score exceeds a predetermined threshold, the captured face will be treated as one would expect. If the score does not meet the predetermined threshold, the captured face will be ignored and treated as would any other inanimate object.

In at least one method of this disclosure, multiple frames in a stream are individually scored. The individual scores of the frames can be normalized using standard statistical methods. Outlier scores of individual frames can be rejected. The scores of the individual frames are averaged to acquire a comprehensive score for a video stream. Based on the comprehensive score, a determination is made as to whether the video stream contains data corresponding to a rendered talker or a genuine talker.

Larger electronic displays (e.g., television monitors) are rarely moved during a videoconference, whereas people move frequently (e.g., talking, turning etc.). It is therefore acceptable to check for monitors with lower frequency than to check for faces. Regardless of the quality of the equipment used there always exists the possibility that a real face can be mistaken for a rendered face. Likewise, regardless of the quality of the equipment used there always exists the possibility that a rendered face can be mistaken for a real face. In at least one example of this disclosure, it is considered more acceptable to include a rendered face in a stream for transmission to a far end than to not include a zoomed view of a real person who is talking. In at least one example of this disclosure, it is possible to intentionally deactivate one or more anti-spoofing techniques to cover (albeit less common) situations in which it is desired by videoconference participants that output of a display be captured by camera, (perhaps as a field expedient).

In at least one example of this disclosure, facial detection analysis is performed more frequently than polygon analysis. In at least one example of this disclosure, facial detection analysis is performed for every frame of a given stream. In some examples coordinate transformation of data captured by a non-panoramic camera is performed and a determination is made as to whether the detected face overlaps a monitor captured by a panoramic camera. In at least one example of this disclosure, only if a face and a monitor overlap will spoofing-analysis be performed.

A videoconferencing apparatus or endpoint 10 in FIG. 1A communicates with one or more remote endpoints 14 over a network 12. Among some common components, the endpoint 10 has an audio module 20 with an audio codec 22 and has a video module 30 with a video codec 32. These modules 20/30 operatively couple to a control module 40 and a network module 70.

During a videoconference, two or more cameras 50A-B capture video and provide the captured video to the video module 30 and video codec 32 for processing. Additionally, one or more microphones (e.g., 28) capture audio and provide the audio to the audio module 20 and audio codec 22 for processing. These microphones 28 can be table or ceiling microphones, or they can be part of a microphone pod or the like. The endpoint 10 uses the audio captured with these microphones 28 primarily for the conference audio.

Separately, microphone arrays 60A-B having orthogonally arranged microphones 62 also capture audio and provide the audio to the audio module 20 for processing. Preferably, the microphone arrays 60A-B include both vertically and horizontally arranged microphones 62 for determining locations of audio sources during the videoconference. Therefore, the endpoint 10 uses the audio from these arrays 60A-B primarily for camera tracking purposes and not for conference audio, although their audio could be used for the conference.

After capturing audio and video, the endpoint 10 encodes it using any of the common encoding standards, such as MPEG-1, MPEG-2, MPEG-4, H.261, H.263 and H.264. Then, the network module 70 outputs the encoded audio and video to the remote endpoints 14 via the network 12 using any appropriate protocol. Similarly, the network module 70 receives conference audio and video via the network 12 from the remote endpoints 14 and sends these to their respective codec 22/32 for processing. Eventually, a loudspeaker 26 outputs conference audio, and a display 34 outputs conference video.

In at least one example of this disclosure, the endpoint 10 uses the two or more cameras 50A-B in an automated and coordinated manner to handle video and views of the videoconference environment dynamically. A first camera 50A can be a fixed or room-view camera, and a second camera 50B can be a controlled or people-view camera. Using the room-view camera 50A, for example, the endpoint 10 captures video of the room or at least a wide or zoomed-out view of the room that would typically include all the videoconference participants as well as some of the surroundings. Although described as fixed, the room-view camera 50A can be adjusted by panning, tilting, and zooming to control its view and frame the environment.

By contrast, the endpoint 10 uses the people-view camera 50B to capture video of one or more participants, and preferably one or more current talkers, in a tight or zoomed-in view. Therefore, the people-view camera 50B is particularly capable of panning, tilting, and zooming.

In one arrangement, the people-view camera 50B is a steerable Pan-Tilt-Zoom (PTZ) camera, while the room-view camera 50A is an Electronic Pan-Tilt-Zoom (EPTZ) camera. As such, the people-view camera 50B can be steered, while the room-view camera 50A can be operated electronically to alter its viewing orientation rather than being steerable. However, the endpoint 10 can use other arrangements and types of cameras. In fact, both cameras 50A-B can be steerable PTZ cameras. Moreover, switching between wide and zoomed views can be shared and alternated between the two steerable cameras 50A-B so that one captures wide views when appropriate while the other captures zoomed-in views and vice-versa.

For the purposes of the present disclosure, one camera 50A is referred to as a room-view camera, while the other camera 50B is referred to as a people-view camera. Although it may be desirable to alternate between tight views of a speaker and wide views of a room, there may be situations where the endpoint 10 can alternate between two different tight views of the same or different speaker. To do this, it may be desirable to have the two cameras 50A-B both be steerable PTZ cameras as noted previously. In another arrangement, therefore, both the first and second cameras 50A-B can be a controlled or people-view camera, such as steerable PTZ cameras. The endpoint 10 can use each of these cameras 50A-B to capture video of one or more participants, including one or more current talkers, in a tight or zoomed-in view as well as providing a wide or zoomed-out view of the room when needed.

In at least one example of this disclosure, the endpoint 10 outputs only video from one of the two cameras 50A-B at any specific time. As the videoconference proceeds, the output video from the endpoint 10 can then switch between the room-view and people-view cameras 50A-B from time to time. In general, the system 10 outputs the video from room-view camera 50A when there is no participant speaking (or operation has degraded), and the endpoint 10 outputs the video from people-view camera 50B when one or more participants are speaking. In one benefit, switching between these camera views allows the far-end of the videoconference to appreciate the zoomed-in views of active participants while still getting a wide view of the meeting room from time to time.

As an alternative, the endpoint 10 can transmit video from both cameras simultaneously, and the endpoint 10 can let the remote endpoint 14 decide which view to show, especially if the endpoint 10 sends some instructions for selecting one or the other camera view. In yet another alternative, the endpoint 10 can transmit video from both cameras simultaneously so one of the video images can be composited as a picture-in-picture of the other video image. For example, the people-view video from camera 50B can be composited with the room-view from camera 50A to be sent to the far end in a picture-in-picture (PIP) format.

To control the views captured by the two cameras 50A-B, the endpoint 10 uses an audio-based locator 42 and a video-based locator 44 to determine locations of participants and frame views of the environment and participants. Then, the control module 40 operatively coupled to the audio and video modules 20/30 uses audio and/or video information from these locators 42/44 to send camera commands to one or both cameras 50A-B to alter their orientations and the views they capture. For the people-view camera 50B, these camera commands can be implemented by an actuator or local control unit 52 having motors, servos, and the like that steer the camera 50B mechanically. For the room-view camera 50A, these camera commands can be implemented as electronic signals to be handled by the camera 50B.

To determine which camera 50A-B to use and how to configure its view, the control module 40 uses audio information obtained from the audio-based locator 42 and/or video information obtained from the video-based locator 44. For example, the control module 40 uses audio information processed by the audio-based locator 42 from the horizontally and vertically arranged microphone arrays 60A-60B. The audio-based locator 42 uses a speech detector 43 to detect speech in captured audio from the arrays 60A-60B and then determines a location of a current participant. The control module 40 using the determined location to then steer the people-view camera 50B toward that location. As also described in more detail below, the control module 40 uses video information processed by the video-based location 44 from the cameras 50A-B to determine the locations of participants, to determine the framing for the views, and to steer the people-view camera 50B at the participants.

The wide view from the room-view camera 50A can give context to the people-view camera 50B and can be used so that participants at the far-end do not see video from the people-view camera 50B as it moves toward a participant. In addition, the wide view can be displayed at the far-end when multiple participants at the near-end are speaking or when the people-view camera 50B is moving to direct at multiple participants. Transitions between the two views from the cameras 50A-B can be faded and blended as desired to avoid sharp cut-a-ways when switching between camera views.

As the people-view camera 50B is moved toward the participant, for example, the moving video from this camera 50B is preferably not transmitted to the far-end of the videoconference. Instead, the video from the room-view camera 50A is transmitted. Once the people-view camera 50B has properly framed the current talker, however, the endpoint 10 switches between the video from the cameras 50A-B.

All the same, the endpoint 10 preferably does not simply switch automatically to capture views of speakers. Instead, camera changes are preferably timed. Too many camera switches over a period of time can be distracting to the conference participants. Accordingly, the endpoint 10 preferably tracks those speakers using their locations, their voice characteristics, their frequency of speaking, and the like. Then, when one speaker begins speaking, the endpoint 10 can quickly direct the people-view camera 50B at that frequent speaker, but the endpoint 10 can avoid or delay jumping to another speaker who may only be responding with short answers or comments.

Although the endpoint 10 preferably operates without user intervention, the endpoint 10 may allow for user intervention and control. Therefore, camera commands from either one or both of the far and near ends can be used to control the cameras 50A-B. For example, the participants can determine the best wide view to be displayed when no one is speaking. Meanwhile, dynamic camera commands can control the people-view camera 50B as the videoconference proceeds. In this way, the view provided by the people-view camera 50B may be controlled automatically by the endpoint 10.

Figure 1B:
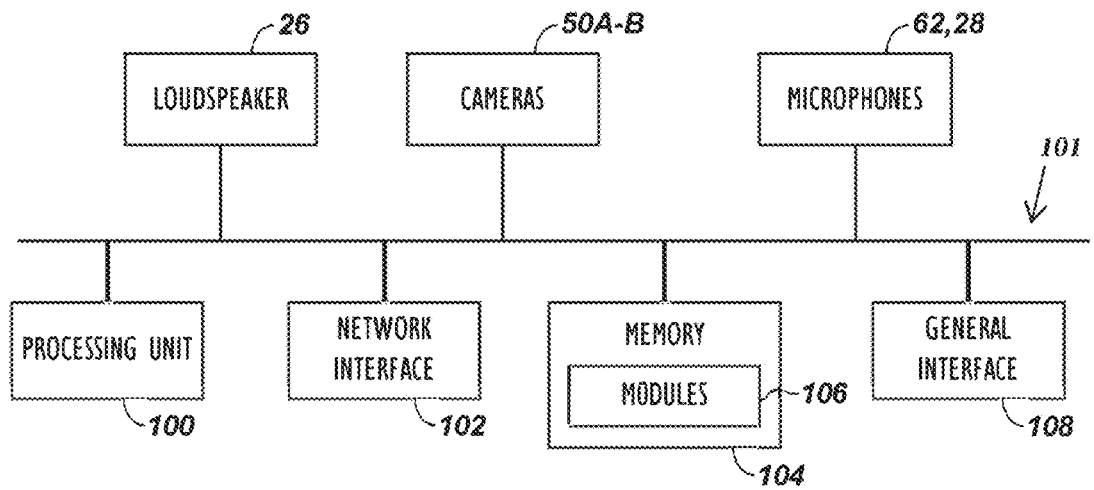
FIG. 1B illustrates aspects of the videoconferencing endpoint of FIG. 1A.

FIG. 1B illustrates aspects of the videoconferencing endpoint 10 of FIG. 1A. As shown and discussed above, the endpoint 10 has two or more cameras 50A-B and several microphones 28, 60A-B, 62. In addition to these, the endpoint 10 has a processing unit 100, a network interface 102, memory 104, and a general input/output (I/O) interface 108 all coupled via a bus 101.

The memory 104 can be any conventional memory such as SDRAM and can store modules 106 in the form of software and firmware for controlling the endpoint 10. In addition to video and audio codecs and other modules discussed previously, the modules 106 can include operating systems, a graphical user interface (GUI) that enables users to control the endpoint 10, and algorithms for processing audio/video signals and controlling the cameras 50A-B. In at least one example of this disclosure, one or more of the cameras (e.g., 50A-B) can be a panoramic camera.

The network interface 102 provides communications between the endpoint 10 and remote endpoints (14). The general I/O interface 108 provides data transmission with local devices such as a keyboard, mouse, printer, overhead projector, display, external loudspeakers, additional cameras, microphone pods, etc. The endpoint 10 can also contain an internal loudspeaker 26.

The cameras 50A-B and the microphone arrays 60A-B capture video and audio, respectively, in the videoconference environment and produce video and audio signals transmitted via the bus 101 to the processing unit 100. In at least one example of this disclosure, the processing unit 100 processes the video and audio using algorithms in the modules 106. For example, the endpoint 10 processes the audio captured by the microphones 28, 62 as well as the video captured by the cameras 50A-B to determine the location of participants and direct the views of the cameras 50A-B. Ultimately, the processed audio and video can be sent to local and remote devices coupled to interfaces 102/108.

In the plan view of FIG. 1C, one arrangement of the endpoint 10 uses a videoconferencing device 80 having microphone arrays 60A-B and two cameras 50A-B integrated therewith. A microphone pod 28 can be placed on a table, although other types of microphones, such as ceiling microphones, individual table microphones, and the like, can be used. The microphone pod 28 communicatively connects to the videoconferencing device 80 and captures audio for the videoconference. For its part, the device 80 can be incorporated into or mounted on a display and/or a videoconferencing unit (not shown).

FIG. 1D shows a plan view of another arrangement of the endpoint 10. Here, the endpoint 10 has several devices 80/81 mounted around the room and has a microphone pod 28 on a table. One main device 80 has microphone arrays 60A-B and two cameras 50A-B as before and can be incorporated into or mounted on a display and/or videoconferencing unit (not shown). The other devices 81 couple to the main device 80 and can be positioned on sides of the videoconferencing environment.

The auxiliary devices 81 at least have a people-view camera 50B, although they can have a room-view camera 50A, microphone arrays 60A-B, or both and can be the same as the main device 80. Either way, audio and video processing described herein can identify which people-view camera 50B has the best view of a participant in the environment. Then, the best people-view camera 50B for the participant can be selected from those around the room so that a frontal view (or the one closest to this view) can be used for conference video.

In FIG. 1E, another arrangement of the endpoint 10 includes a videoconferencing device 80 and a remote emitter 64. This arrangement can be useful for tracking a participant who moves during a presentation. Again, the device 80 has the cameras 50A-B and microphone arrays 60A-B. In this arrangement, however, the microphone arrays 60A-B are responsive to ultrasound emitted from the emitter 64 to track a presenter. In this way, the device 80 can track the presenter as he/she moves and as the emitter 64 continues to emit ultrasound. In addition to ultrasound, the microphone arrays 60A-B can be responsive to voice audio as well so that the device 80 can use voice tracking in addition to ultrasonic tracking. When the device 80 automatically detects ultrasound or when the device 80 is manually configured for ultrasound tracking, then the device 80 can operate in an ultrasound tracking mode. In FIG. 1E, meeting participant 65 is facing camera 50A and camera 50B. Camera 50A is thus a leftward camera, and camera 50B is a rightward camera.

As shown in FIG. 1E, the emitter 64 can be a pack worn by the participant 65. The emitter 64 can have one or more ultrasound transducers 66 that produce an ultrasound tone and can have an integrated microphone 68 and a radio frequency (RF) emitter 67. When used, the emitter unit 64 may be activated when the integrated microphone 68 picks up the participant 65 speaking. Alternatively, the participant can actuate the emitter unit 64 manually so that an RF signal is transmitted to an RF unit 97 to indicate that this specific participant 65.

FIG. 2A illustrates a videoconferencing device 80, in accordance with an example of this disclosure. Videoconferencing device 80 has a housing with a horizontal array 60A of microphones 62A disposed thereon. Extending from this housing, a vertical array 60B also has several microphones 62B. As shown, these arrays 60A-B can each have three microphones 62A-B, although either array 60A-B can have a different number of microphones than depicted.

The leftward camera 50A can be a room-view camera intended to obtain wide or zoomed-out views of a videoconference environment. The rightward camera 50B can be a people-view camera intended to obtain tight or zoomed-in views of videoconference participants. These two cameras 50A-B are mounted on the housing of the device 80 and can be integrated therewith. The room-view camera 50A has image processing components 52A that can include an actuator if not an EPTZ camera. The people-view camera 50B also has image processing components 52B that include an actuator to control the pan-tilt-zoom of the camera's operation. These components 52A-B can be operatively coupled to a local control unit 90 housed in the device 80.

In at least one example of this disclosure, the control unit 90 includes some or all the necessary components for conducting a videoconference, including audio and video modules, network module, camera control module, etc. Alternatively, all or some of the necessary videoconferencing components may be housed in a separate videoconferencing unit 95 coupled to the device 80. As such, the device 80 may be a stand-alone unit having the cameras 50A-B, the microphone arrays 60A-B, and other related components, while the videoconferencing unit 95 handles all videoconferencing functions. In at least one example of this disclosure, the device 80 and the unit 95 are combined.

Rather than having two or more integrated cameras 50A-B as in FIG. 2A, the disclosed device 80 as shown in FIG. 2B can have one integrated camera 53. Alternatively, as shown in FIGS. 2C-2D, the device 80 can include a base unit 85 having the microphone arrays 60A-B, communication ports (not shown), and other processing components (not shown). Two or more separate camera units 55A-B can connect onto the base unit 85 to make the device 80 (FIG. 2C), or one separate camera unit 55 can be connected thereon (FIG. 2D). Accordingly, the base unit 85 can hold the microphone arrays 60A-B and all other required electronic and signal processing components and can support the one or more camera units 55 using an appropriate form of attachment.

Although the device 80 has been shown having two cameras 50A-B situated adjacent to one another, either or both cameras 50A-B can be entirely separate from the device 80 and connected to an input of the housing. In addition, the device 80 can be configured to support additional cameras instead of just two. In this way, users could install other cameras, which can be wirelessly connected to the device 80 and positioned around a room, so that the device 80 can always select the best view for a talker.

FIG. 3 illustrates components that can be part of the device 80 of FIGS. 2A-2D. As shown, the device 80 includes the microphone arrays 60A-B, a control processor 110, a Field Programmable Gate Array (FPGA) 120, an audio processor 130, and a video processor 140. As noted previously, the device 80 can be an integrated unit having the two or more cameras 50A-B integrated therewith (see FIG. 2A), or these cameras 50A-B can be separate units having their own components and connecting to the device's base unit (see FIG. 2C). In addition, the device 80 can have one integrated camera (53, FIG. 2B) or one separate camera (55, FIG. 2D).

In at least one example of this disclosure, the FPGA 120 captures video inputs from the cameras 50A-B, generates output video for the videoconferencing unit 95, and sends the input video to the video processor 140. The FPGA 120 can also scale and composite video and graphics overlays. The audio processor 130, which can be a Digital Signal Processor, captures audio from the microphone arrays 60A-B and performs audio processing, including echo cancelation, audio filtering, and source tracking. The audio processor 130 also handles rules for switching between camera views, for detecting conversational patterns, and other purposes disclosed herein.

The video processor 140—which can comprise a Digital Signal Processor (DSP)—captures video from the FPGA 120 and handles motion detection, face detection, and other video processing to assist in tracking participants, in accordance with an example of this disclosure. The video processor 140 can perform a motion detection algorithm on video captured from the people-view camera 50B to check for motion in the current view of a candidate talker location found by a speaker tracking algorithm. This can avoid directing the camera 50B at reflections from walls, tables, or the like. In addition, the video processor 140 can use a face-finding algorithm to further increase the tracking accuracy by confirming that a candidate speaker location does indeed frame a view having a human face. In at least one example of this disclosure, a determination can be made as to whether the human face corresponds to a participant 65 at the endpoint (10) or if the human face is being rendered on a display device (34).

The control processor 110, handles communication with the videoconferencing unit 95 and handles camera control and overall system control of the device 80. For example, the control processor 110 controls the pan-tilt-zoom communication for the cameras' components and controls the camera switching by the FPGA 120. In at least one example of this disclosure, distinguishing between a genuine face and a rendered face lies in that a genuine face is stereoscopic while a rendered on a display surface face is flat. Consequently, points on a rendered face locate on the same plane, while points on a genuine face locate on different planes.

Figure 4A:
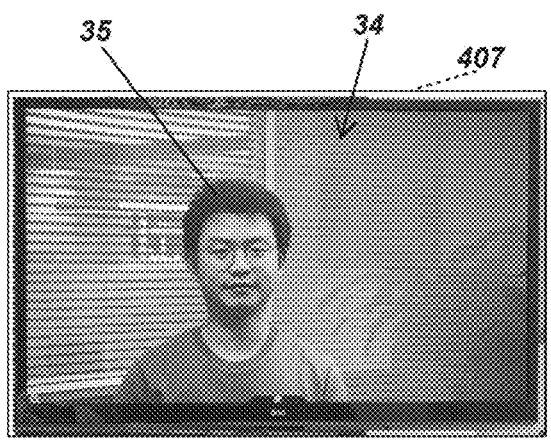
FIG. 4A illustrates a rendered face captured by a leftward camera, in accordance with an example of this disclosure.

FIG. 4A illustrates a rendered participant 35 rendered on an electronic display 34, as captured by a leftward camera (50A, 506). Electronic display 34 is displaying the participant 35. Under most circumstances it would be undesirable to include the data corresponding to image 407 of FIG. 4A in a feed for transmission to a remote endpoint (14).

Figure 4B:
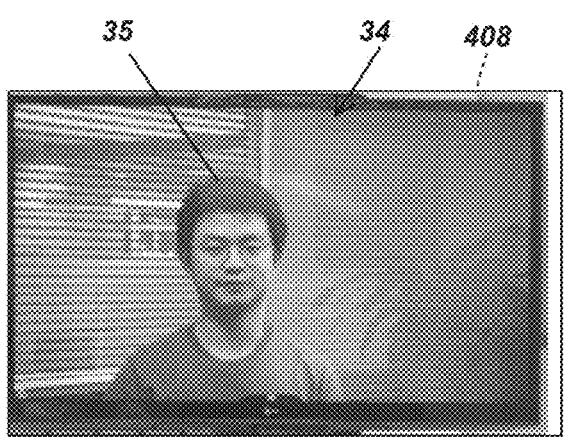
FIG. 4B illustrates the rendered face of FIG. 4A captured by a rightward camera, in accordance with an example of this disclosure.

FIG. 4B illustrates a rendered participant 35 rendered on an electronic display 34, as captured by a rightward camera (50B, 502). Electronic display 34 is displaying the participant 35. Under most circumstances it would be undesirable to include the data corresponding to image 408 of FIG. 4B in a feed for transmission to a remote endpoint (14).

Figure 4C:
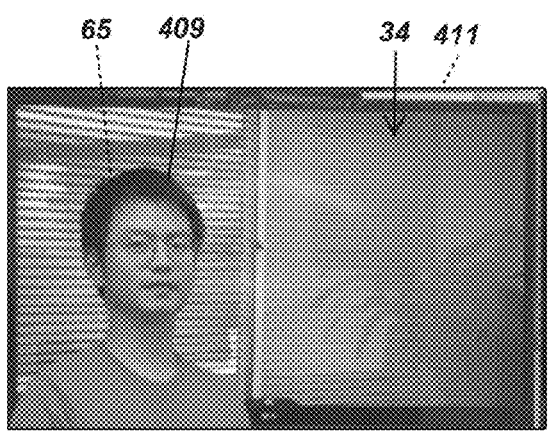
FIG. 4C illustrates a genuine face captured by the leftward camera of FIG. 4A, in accordance with an example of this disclosure.

FIG. 4C illustrates a genuine participant 65 captured by the leftward camera (50A, 506). The subject 409 of the image 411 is standing in front of the electronic display 34. Under most circumstances it would be desirable to include the data corresponding to image 411 in a feed for transmission to a remote endpoint (14), especially if the participant 65 is talking.

Figure 4D:
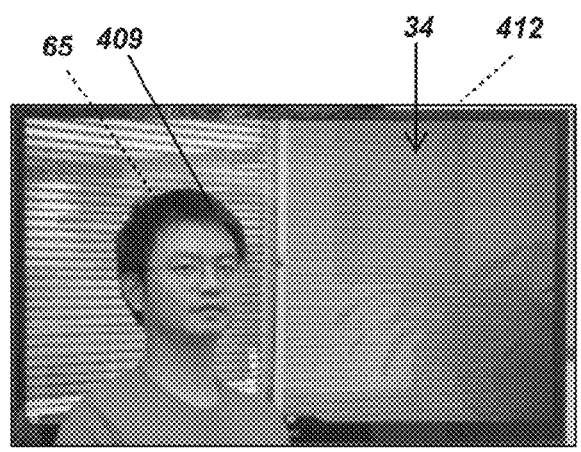
FIG. 4D illustrates the genuine face captured by the rightward camera of FIG. 4B, in accordance with an example of this disclosure.

FIG. 4D illustrates the genuine participant 65 captured by the rightward camera (50B, 502). The subject 409 (65) of the image 412 is standing in front of the electronic display 34. During a videoconference, it would usually be desirable to include the data corresponding to image 412 in a feed for transmission to a remote endpoint (14), especially if the participant 65 is talking.

Figure 5:
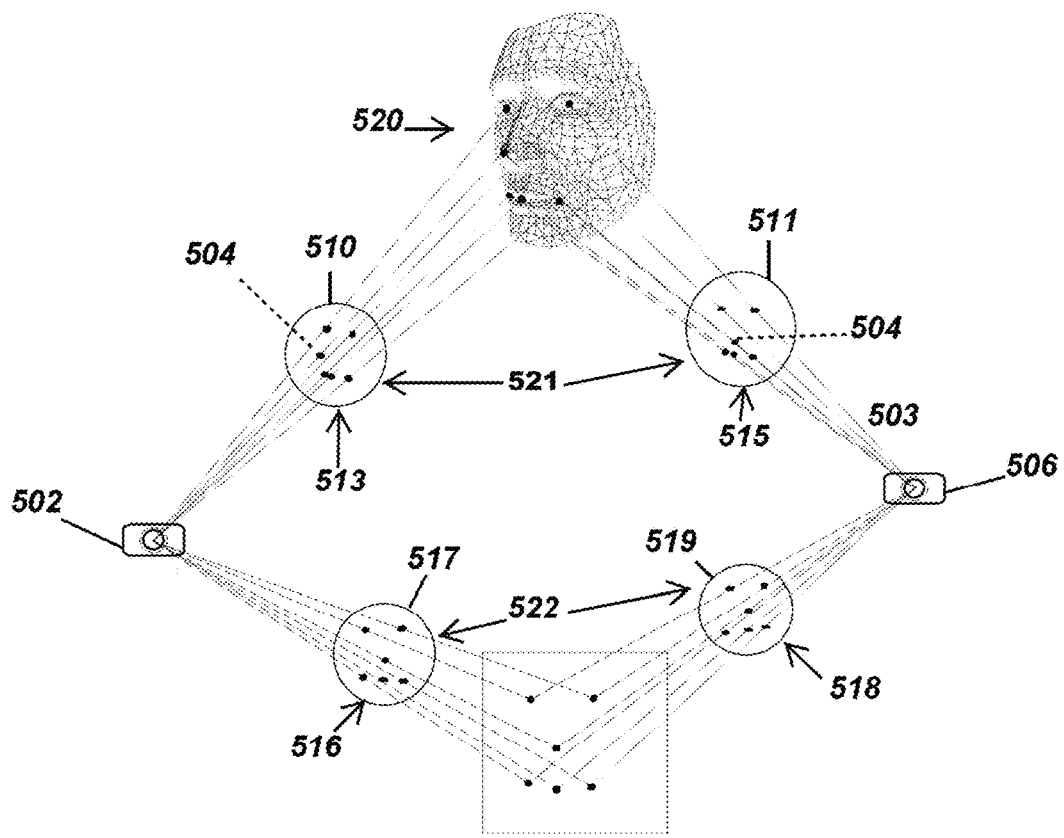
FIG. 5 illustrates analysis of the rendered face and the genuine face of FIGS. 4A-D, in accordance with an example of this disclosure.

FIG. 5 illustrates analysis of the image data captured of rendered participant 35 and genuine participant 65 of FIGS. 4A-D. FIG. 5 shows leftward camera 506 capturing data 503 of the genuine participant 65 of FIG. 4C. For the genuine participant 65 of FIG. 4C, rightward camera 502 captures a nose point 504 which is to the left of the other captured points 510. Leftward camera 506 also captures a nose point 504, but the nose point 504 is surrounded by points 511 from other places on the genuine face (corresponding to the genuine participant 65 who is captured by the cameras 506, 502). The pattern 513 formed by the facial feature points 510 captured by the rightward camera 502 is dissimilar to the pattern 515 formed by the facial feature points 511 captured by the leftward camera 506. Conversely, the pattern 516 of rendered (electronically displayed) facial feature points 517 captured by the rightward camera 502 is similar to the pattern 518 of rendered facial feature points 519 captured by the leftward camera 506. Being real, and existing in three dimensions, the facial features 520 of the genuine participant 65 are in different planes, whereas the facial features 520 which are rendered on the electronic display (34) exist in the single plane of the display surface of the electronic display (34). In one or more examples of this disclosure, determining whether two clusters of points (e.g., 510, 511) correspond to a genuine participant 65 or two clusters of points (e.g., 516, 518) correspond to a displayed participant (35) can be based on the degree of similarity between clusters.

In at least one example of this disclosure, there are sixty-eight landmarks on a human face (600). The number of landmarks (601) detected can vary depending on various factors such as the quality of the facial data captured by the cameras (506, 502), the angle of the face relative to each camera (506, 502), and lighting conditions. At least one example of this disclosure includes a method of scoring two face pictures (e.g., 411, 412). Three points which do not reside on the same line define a plane. Points on a displayed face (e.g., of participant 35) are located in the plane of the display 34 by which they are rendered. Points on a genuine face (e.g., of genuine participant 65) are located in a three-dimensional space and therefore form a different plane which is not parallel with the plane of the electronic display (34). Of the sixty-eight facial landmarks available for analysis, in at least one example of this disclosure, five facial landmarks (603, 605, 504, 607, 609) are used. Using the five facial landmarks (603, 605, 504, 607, 609) can be technically advantageous over using other facial landmarks within the group of sixty-eight facial landmarks.

Figure 6:
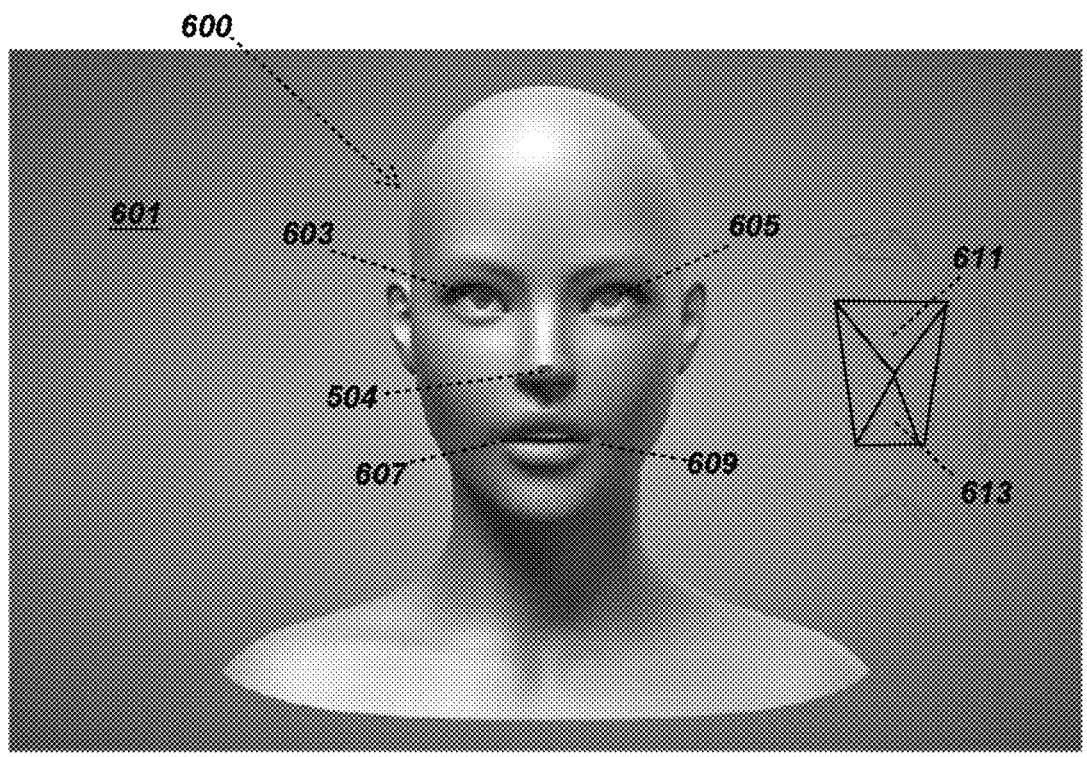
FIG. 6 illustrates facial landmarks, in accordance with an example of this disclosure.

FIG. 6 illustrates facial landmarks 601 in accordance with an example of this disclosure. The facial landmarks 601 of face 600 include a right-eye-point 603 (subject's right eye facing cameras 50A-B, 502, 506), left-eye-point 605, a nose-point 504, a right-corner-of-mouth point 607, and a left-corner-of-mouth point 609. The left-eye-point 605, the right-eye-point 603, and the nose-point 504 define a top plane 611. The nose-point 504, the left-corner-of-mouth point 609, and the right-corner-of-mouth point 607 define a bottom plane 613. The top plane 611 is stereoscopic with respect to the bottom plane 613. The top plane 611 intersects with the bottom plane 613. The top plane 611 and the bottom plane 613 are different from one another. In at least one example of this disclosure, pairs (521, 522) of key point 601 clusters (e.g., 510), are taken from the leftward camera 506 and the rightward camera 502. The pairs (521, 522) comprise the left-eye-point 605 from the leftward camera 506 and the left-eye-point 605 from the rightward camera 502, the right-eye-point 603 from the leftward camera 506 and right-eye-point 603 from the rightward camera 502, the nose-point 504 from the leftward camera 506 and the nose-point 504 from the rightward camera 502, the left-corner-of-mouth point 609 from the leftward camera 506 and the left-corner-of-mouth point 609 from the rightward camera 502, and the right-corner-of-mouth point 607 from the leftward camera 506 and the right-corner-of-mouth point 607 from the rightward camera 502. In at least one example of this disclosure, a mapping matrix of the five key point pairs corresponding to the top plane captured by the leftward camera and the top plane captured by the rightward camera is calculated. Based on the mapping matrix, a bottom plane can be mapped, constituting a "mapped" bottom plane. An "original" bottom plane based on the nose-point pairs, the left-corner-of-mouth pairs, and the right-corner-of mouth pairs can be determined. The three points of the "original" bottom plane and the "mapped" bottom plane can then the compared. In at least one example of this disclosure, the intersection of the "mapped" bottom plane and the "original" bottom plane can be determined. The degree to which the "mapped" bottom plane and the "original" bottom plane intersect can be used to determine an "intersection" score. The higher that an "intersection" score is, the greater the likelihood that the face captured by the leftward camera and the rightward camera is a face displayed on a flat surface. The greater the "intersection" score is, the more likely the face is a "displayed" face, rather than a face of a person present at the videoconferencing endpoint.

Score Calculation

In at least one example of this disclosure, the number of key points considered is reduced to the five discussed above. Reducing the number of facial key points to five can increase the accuracy of distinguishing between real faces and displayed faces. Accuracy of the analysis can be increased further by averaging the data in multiple frames captured by the leftward camera and the rightward camera. Thus, creating a "score queue" or score array for comparisons of paired frames from the streams captured by the leftward camera and the rightward camera can produce more reliable results. In at least one example of this disclosure, frames from additional streams captured by one or more additional cameras can be similarly used and or cross-referenced. For example, three cameras can be used to generate three top planes (a first camera and a second camera produce a first top plane, as above, the first camera and a third camera produce a second top plane, and the second camera and the third camera generate a third top plane, and so on). The values of the three planes can be average to produce a "fourth" top plane. We promote a "Score Queue" to take advantage of video stream for more reliable result.

Figure 7A:
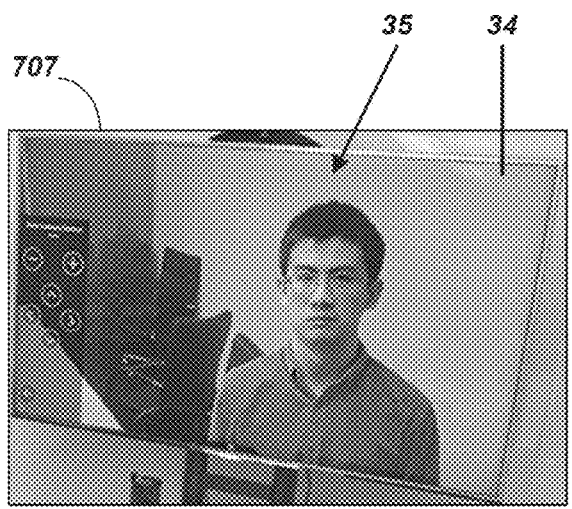
FIG. 7A illustrates a displayed face as captured by a leftward camera, in accordance with an example of this disclosure.
Figure 7B:
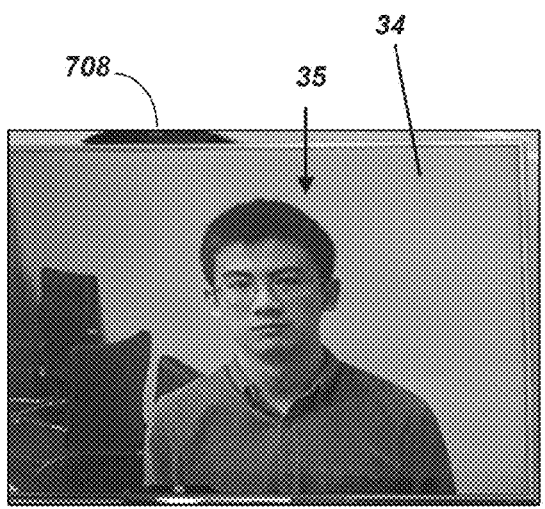
FIG. 7B illustrates the displayed face from FIG. 7A as captured by a rightward camera, in accordance with an example of this disclosure.
Figure 7C:
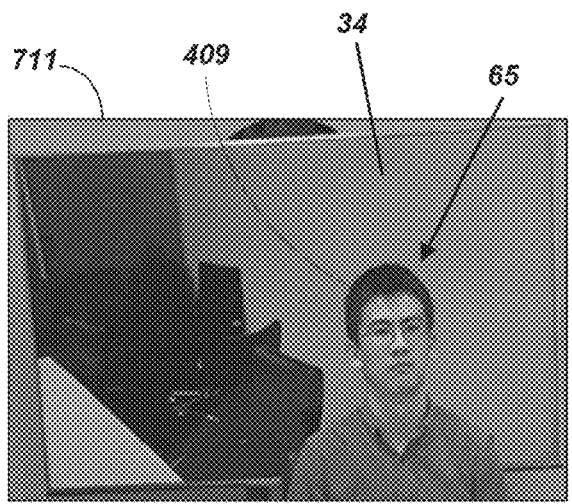
FIG. 7C illustrates a genuine face as captured by the leftward camera of FIG. 7A, in accordance with an example of this disclosure.
Figure 7D:
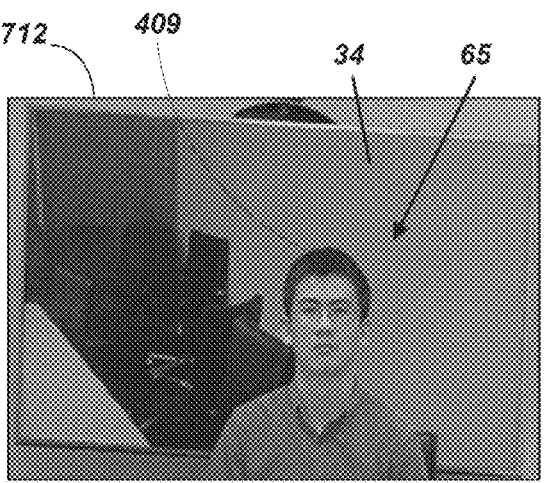
FIG. 7D illustrates the genuine face from FIG. 7C as captured by the rightward camera of FIG. 7B, in accordance with an example of this disclosure.

FIG. 7A illustrates a displayed face as captured by a leftward camera. FIG. 7B illustrates the displayed face from FIG. 7A as captured by a rightward camera. FIG. 7C illustrates a genuine face as captured by a leftward camera. FIG. 7D illustrates the genuine face from FIG. 7C as captured by a rightward camera. For each of the images shown in FIGS. 7A-D facial landmarks are detected, as discussed above.

FIG. 7A illustrates a rendered participant 35 rendered on an electronic display 34, as captured by a leftward camera (50A, 506). Electronic display 34 is displaying the partici pant 35. Under most circumstances it would be undesirable to include the data corresponding to image 707 of FIG. 7A in a feed for transmission to a remote endpoint (14).

FIG. 7B illustrates a rendered participant 35 rendered on an electronic display 34, as captured by a leftward camera (50B, 506). Electronic display 34 is displaying the participant 35. Under most circumstances it would be undesirable to include the data corresponding to image 708 of FIG. 4B in a feed for transmission to a remote endpoint (14).

FIG. 7C illustrates a genuine participant 65 captured by the leftward camera (50A, 506). The subject 409 of the image 711 is standing in front of the electronic display 34. Under most circumstances it would be desirable to include the data corresponding to image 711 in a feed for transmission to a remote endpoint (14), especially if the participant 65 is talking.

FIG. 7D illustrates the genuine participant 65 captured by the rightward camera (50B, 502). The subject 409 (65) of the image 412 is standing in front of the electronic display 34. During a videoconference, it would usually be desirable to include the data corresponding to image 712 in a feed for transmission to a remote endpoint (14), especially if the participant 65 is talking.

Figure 8A:
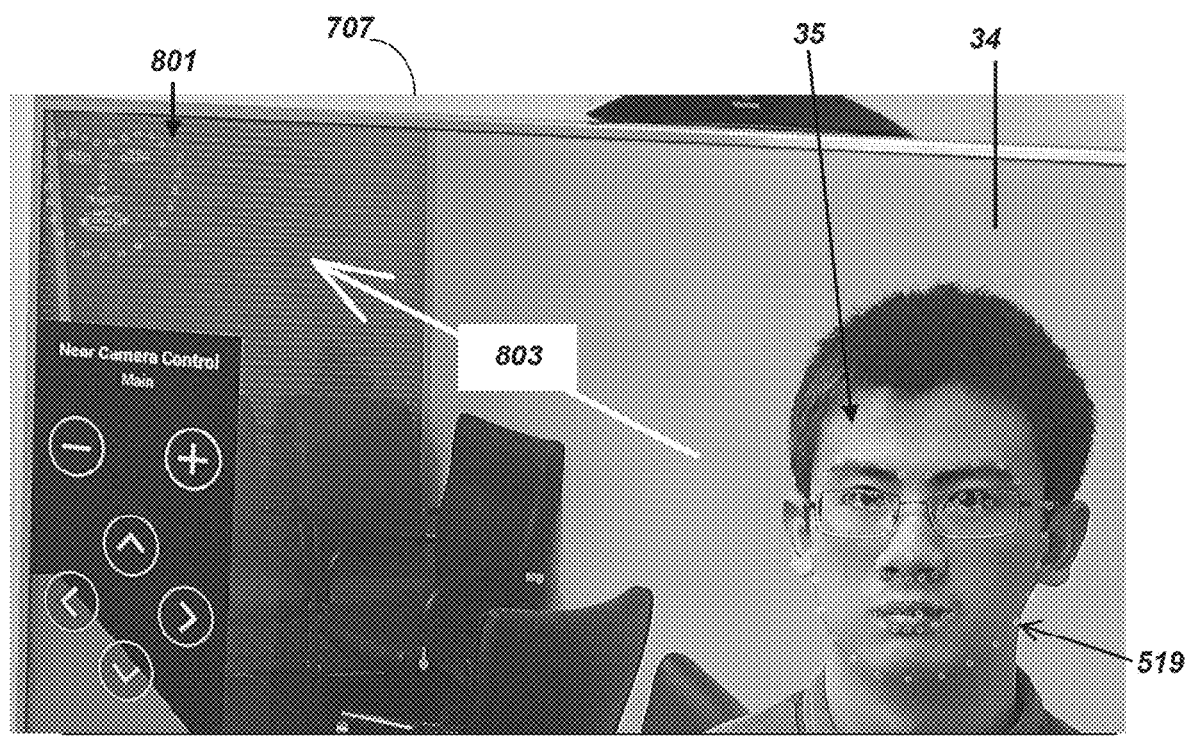
FIG. 8A illustrates a method of determining a rotational matrix for the displayed face of FIG. 7A, in accordance with an example of this disclosure.
Figure 8B:
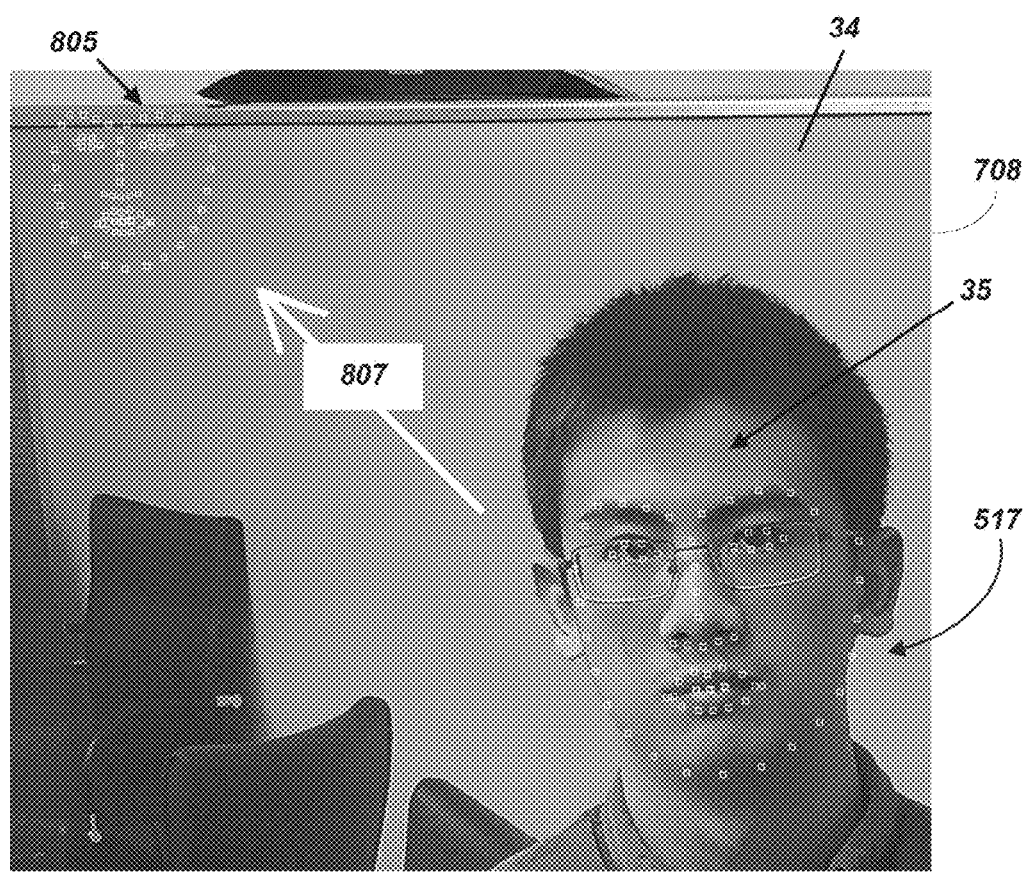
FIG. 8B illustrates a method of determining a rotational matrix for the displayed face of FIG. 7B, in accordance with an example of this disclosure.

FIG. 8A illustrates the detected facial landmarks 519 associated with the displayed face of FIG. 7A. In at least one example of this disclosure, a matrix 801, based on the facial landmarks 519, is calculated 803 for rotating and scaling. In at least one example of this disclosure, the matrix 801 can be used to standardize the facial landmark points 511 so that the facial landmarks 519 of those persons whose images are captured by different cameras can be compared in a meaningful manner, as shown FIG. 9A and FIG. 9B, below. Standardizing the landmarks 519 enables scaling of landmarks 519 so that the faces being compared are of the same scale. Standardization also enables relocation of landmarks 519 so that the center of each face will have the same coordinate. Standardizing the landmarks 519 also enables the landmarks 519 to be rotated so that the eyes of the subject in each figure can be horizontally aligned with the other. Likewise, as shown in FIG. 8B, a second matrix 805, based on the facial landmarks of FIG. 7B, is calculated 807 for rotating and scaling. The second matrix 805 can also be used to correlate the facial landmark points to standard points for storing and comparison, as shown in point cluster. The data associated with the two (matrix) point clusters (e.g., 801, 805) are then compared, and the distances between the various key points of the point clusters are calculated. In at least one example of this disclosure, a standard size, a center, and an angle are selected for calculating the individual points of the point clusters.

In the example illustrated in FIG. 8A, a distance vector (760, 535), a degree of rotation (−5.38), and a scaling index (0.55406871) are determined, yielding the following rotation matrix:

$$\begin{bmatrix} 5.51626503e-01 & -5.19648155e-02 & 3.68565034e+02 \\ 5.19648155e-02 & 5.51626503e-01 & 2.00386561e+02 \end{bmatrix} \quad \text{(Matrix 1)}$$

Matrix 1 can be calculated with a distance vector, rotation degree, and scaling value using the following function in OpenCV SDK™:

$$cv2::getRotationMatrix2D(\text{Point } 2fcenter, \text{double angle}, \text{double scale}) \quad \text{(Function 1)}$$

With the rotation matrix (matrix 1), the points in the cluster can be generated from the facial landmarks using matrix multiplication according to the following function call:

$$\text{secondArray=np.matmul(firstArray,MATRIX·}T) \quad \text{(Function 2)}$$

The same process can be performed for the facial landmarks of FIG. 7B, as illustrated in FIG. 8B. FIG. 8B illustrates the determination of a second rotation matrix for distance vector (1191, 574), rotation degree (−358.73), and scaling coefficient (0.5645685), yielding the following rotation matrix:

$$\begin{bmatrix} 5.64431235e-01 & 1.24506890e-02 & 5.11615704e+02 \\ -1.24506890e-02 & 5.64431235e-01 & 2.64845242e+02 \end{bmatrix} \quad \text{(Matrix 2)}$$

Figure 8C:
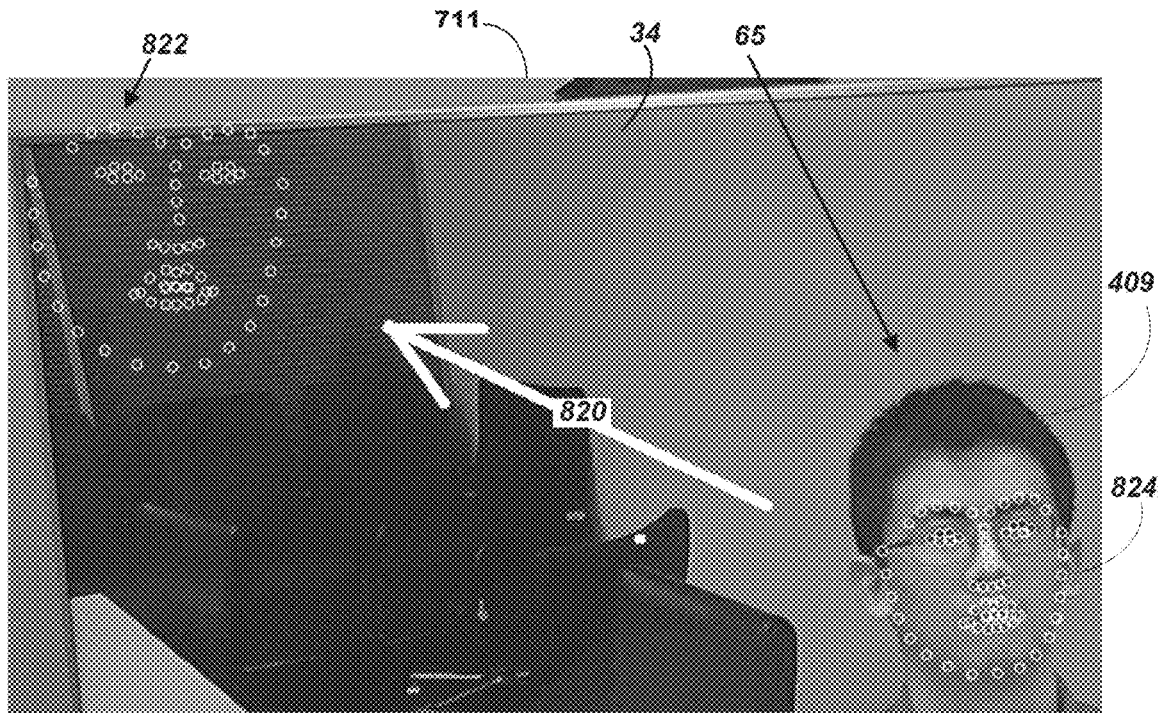
FIG. 8C illustrates a method of determining a rotational matrix for the genuine face of FIG. 7C, in accordance with an example of this disclosure.

FIG. 8C illustrates the determination 820 of a third rotation matrix 822 for facial landmarks 824. A distance vector (732, 359), rotation degree (−6.22), and scaling coefficient (1.38812813) yield the matrix 822 with the following values:

$$\begin{bmatrix} 1.37994120e+00 & -1.50539040e-01 & -2.24073440e+02 \\ 1.50539040e-01 & 1.37994120e+00 & -2.46593466e+02 \end{bmatrix} \quad \text{(Matrix 3)}$$

Figure 8D:
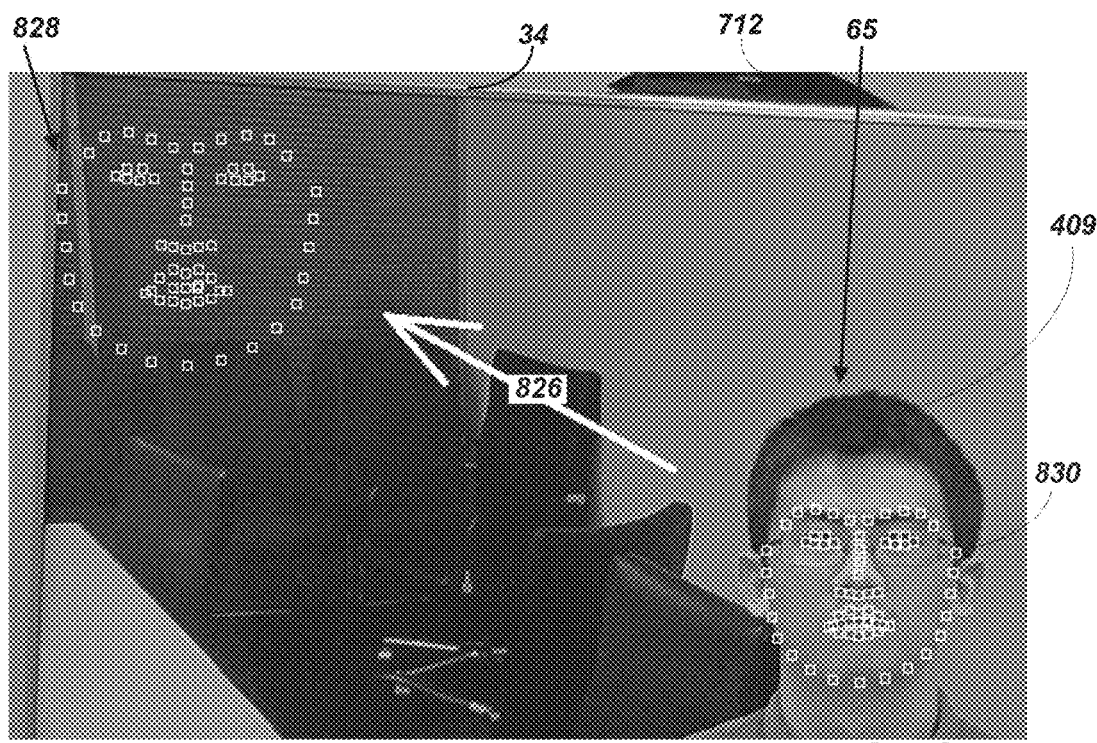
FIG. 8D illustrates a method of determining a rotational matrix for the genuine face of FIG. 7D, in accordance with an example of this disclosure.

FIG. 8D illustrates the determination 826 of a fourth rotation matrix 828 for facial landmarks 830. A distance vector (604, 348), rotation degree (0.0), and scaling coefficient (1.34736842) yield the following rotation matrix:

$$\begin{bmatrix} 1.34736842 & 0.0 & -209.8105263 \\ 0.0 & 1.34736842 & -120.88421053 \end{bmatrix} \quad \text{(Matrix 4)}$$

Figure 9A:
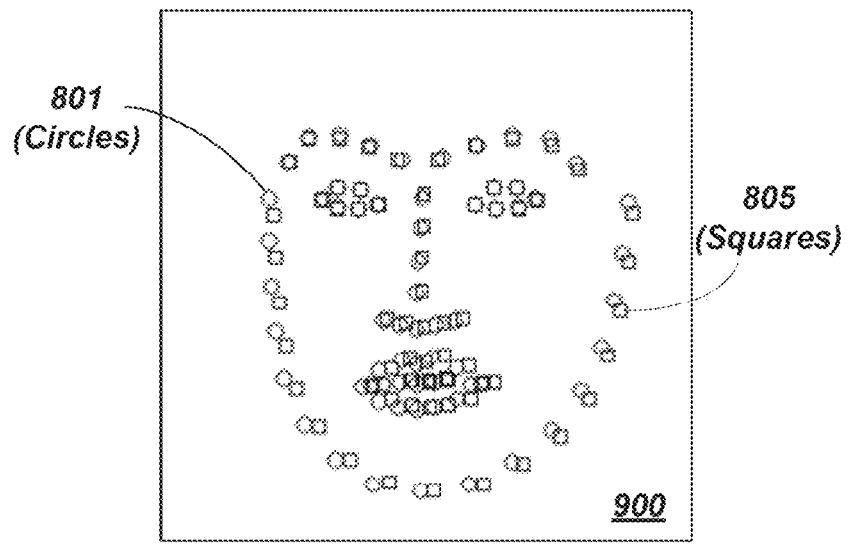
FIG. 9A shows the overlay of the facial landmarks from FIGS. 7A-7B, and the rotational matrixes of FIGS. 8A-8B.

Thereafter the left image facial data 801 and the right image facial data 805 of the displayed face are combined 900 as shown in FIG. 9A. For the images of FIG. 8A and FIG. 8B, NoseTop=18.20, RightMouthCorner=29.33, LeftMouthCorner=47.40, and AVERAGE=31.64, ([47.40+ 29.33+18.20]/3).

Figure 9B:
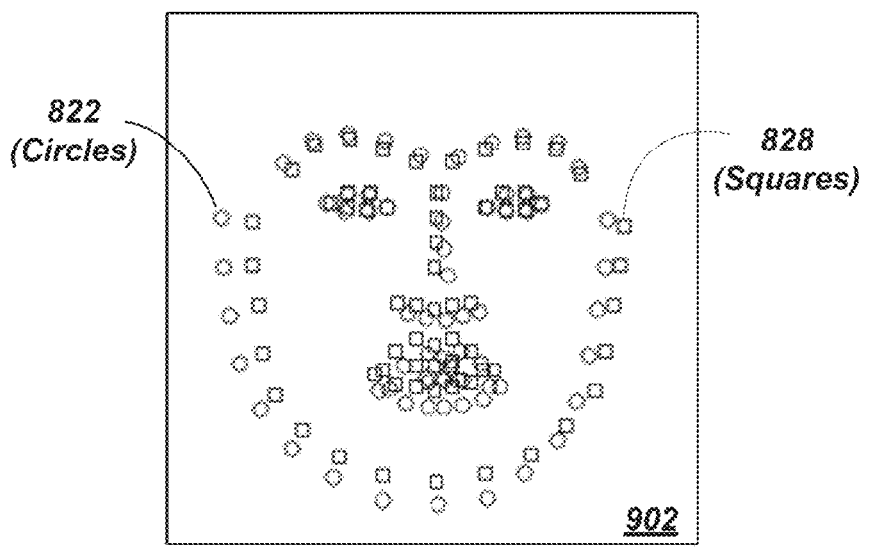
FIG. 9B shows the overlay of the facial landmarks from FIGS. 7C-7D, and the rotational matrixes of FIGS. 8C-8D.

The left side facial landmark data 822 and the right side landmark data 828 of the genuine face are combined 902 as shown in FIG. 9B. For the images of FIG. 8C and FIG. 8D, NoseTop=52.90, RightMouthCorner=65.85, LeftMouthCorner=105.45, and AVERAGE: 74.73.

In at least one example of this disclosure, with multiple frames in a video, it is possible to fetch the AVERAGE of every frame to score the (possible) face, so that spoofing faces and genuine faces can be distinguished by the value. For example, with ten AVERAGE values in queue, it is possible to drop the biggest and smallest values, then average left eight AVERAGE values to get a score.

In at least one example of this disclosure, scores from a spoofing detection step will be put into a queue frame by frame. With a queue of score, it is possible to eliminate highest and lowest part of scores, to eliminate abnormal scores. The remaining scores are then averaged to produce a comprehensive score, which reflects the final possibility of whether it's spoofing speaker or genuine speaker. In at least one example of this disclosure, the threshold eighty-five percent similarity between facial data captured by two cameras for there to be a determination that spoofing is evident.

Figure 10:
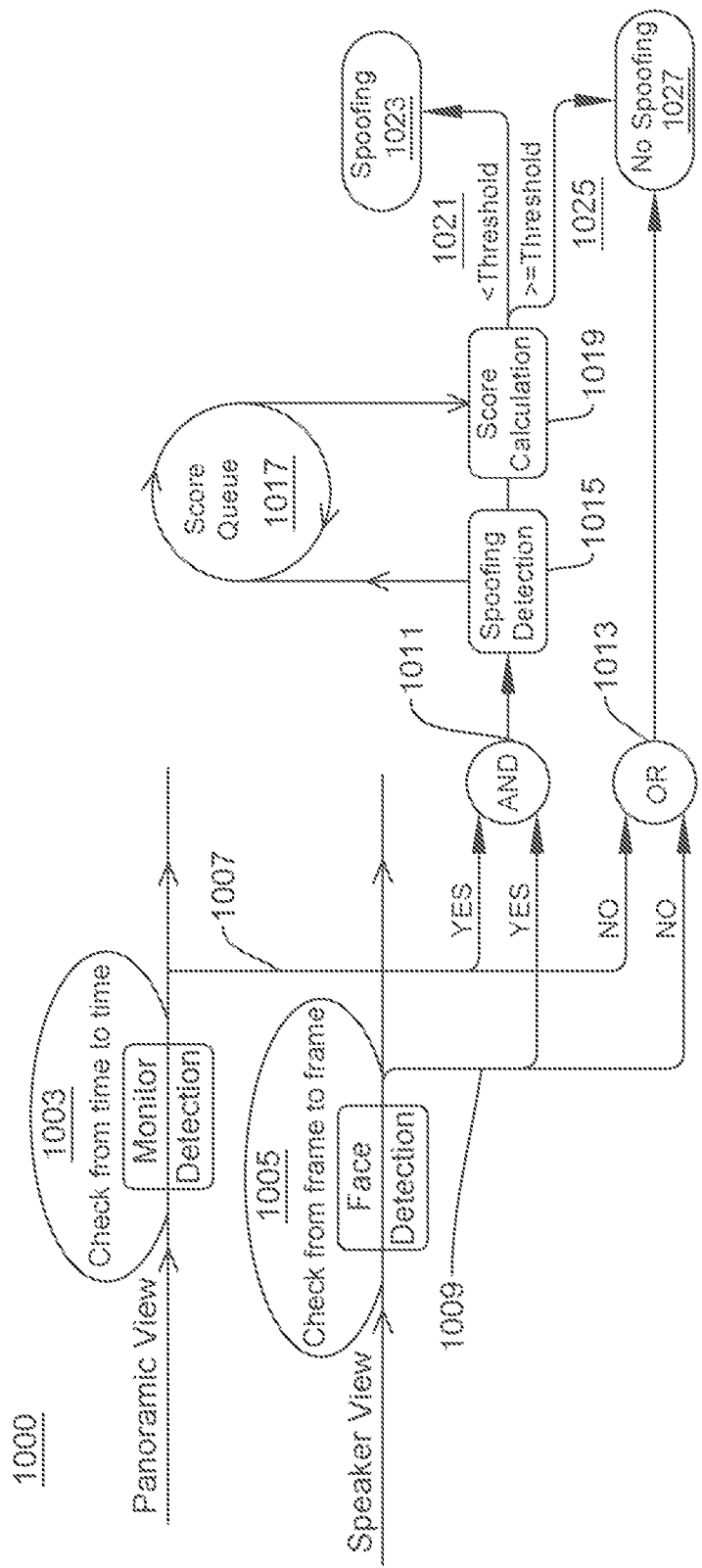
FIG. 10 is a flowchart of a method of establishing a rendered face, in accordance with an example of this disclosure.

FIG. 10 is a flowchart of a method 1000 of establishing a rendered face, in accordance with an example of this disclosure. The method 1000 includes iteratively determining 1003 whether a display monitor is present in data captured by a panoramic camera. The method 1000 also includes iteratively determining 1005 whether data captured by a speaker view camera contains a face. Checking 1005 for facial data occurs more often than checking 1003 for a display monitor. When the data 1007 from the panoramic camera indicates there is a display monitor and the data 1009 from the speaker view camera indicates 1011 there is a face in the area of the display monitor, a spoofing condition exists 1015. If the data 1007 from the panoramic camera indicates there is not a display monitor or the data 1009 from the speaker view camera indicates there is not a face 1013, then there is no spoofing 1027. If spoofing is detected 1015 the detection data gets stored in a spoofing queue 1017 and after several frames consistent with spoofing are stored, the differences between the (matrix-transformed) facial data for corresponding frames captured by the two cameras are scored 1019. If the degree of dissimilarity between the two clusters of facial data exceeds a threshold 1025 (e.g., the analogous facial landmarks are differently dispersed), then the faces captured by the cameras correspond to real people, and no spoofing is occurring 1027. If, on the other hand, the degree of difference between the facial data from the two cameras does not meet the threshold 1021, then spoofing 1023 is occurring.

Figure 11:
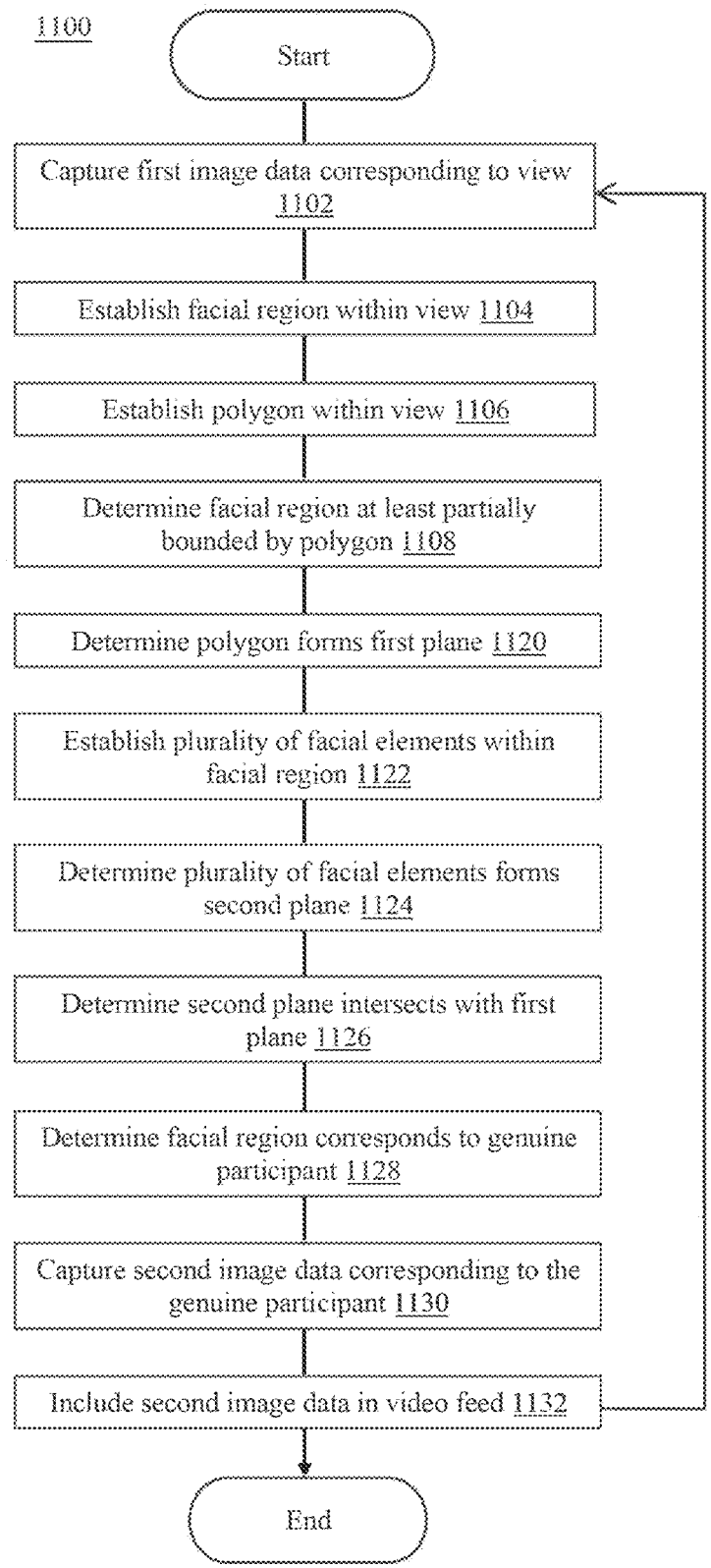
FIG. 11 is a flowchart of a method of establishing a genuine face, in accordance with an example of this disclosure.

FIG. 11 is a flowchart of a method 1100 of establishing a genuine participant, in accordance with an example of this disclosure. The method 11 comprises: capturing 1102, using one or more optical devices, first image data corresponding to a view; establishing 1104, using a processor, a facial region within the view; establishing 1106, using the processor, a polygon within the view; determining 1108, using the processor, that the facial region is at least partially bounded by the polygon; determining 1120, using the processor, that the polygon forms a first plane; establishing 1122, using the processor, a plurality of facial elements within the facial region; determining 1124, using the processor, that the plurality of facial elements forms a second plane; determining 1126, using the processor, that the second plane intersects with the first plane; determining 1128, using the processor, that the facial region corresponds to a genuine participant, wherein determining that the facial region corresponds to the genuine participant is based, at least in part, on the determination that the second plane intersects with the first plane; capturing 1130, using the one or more optical devices, second image data corresponding to the genuine participant; including 1132 the second image data in a video feed. The video feed may be sent to a remote endpoint (14).

Figure 12:
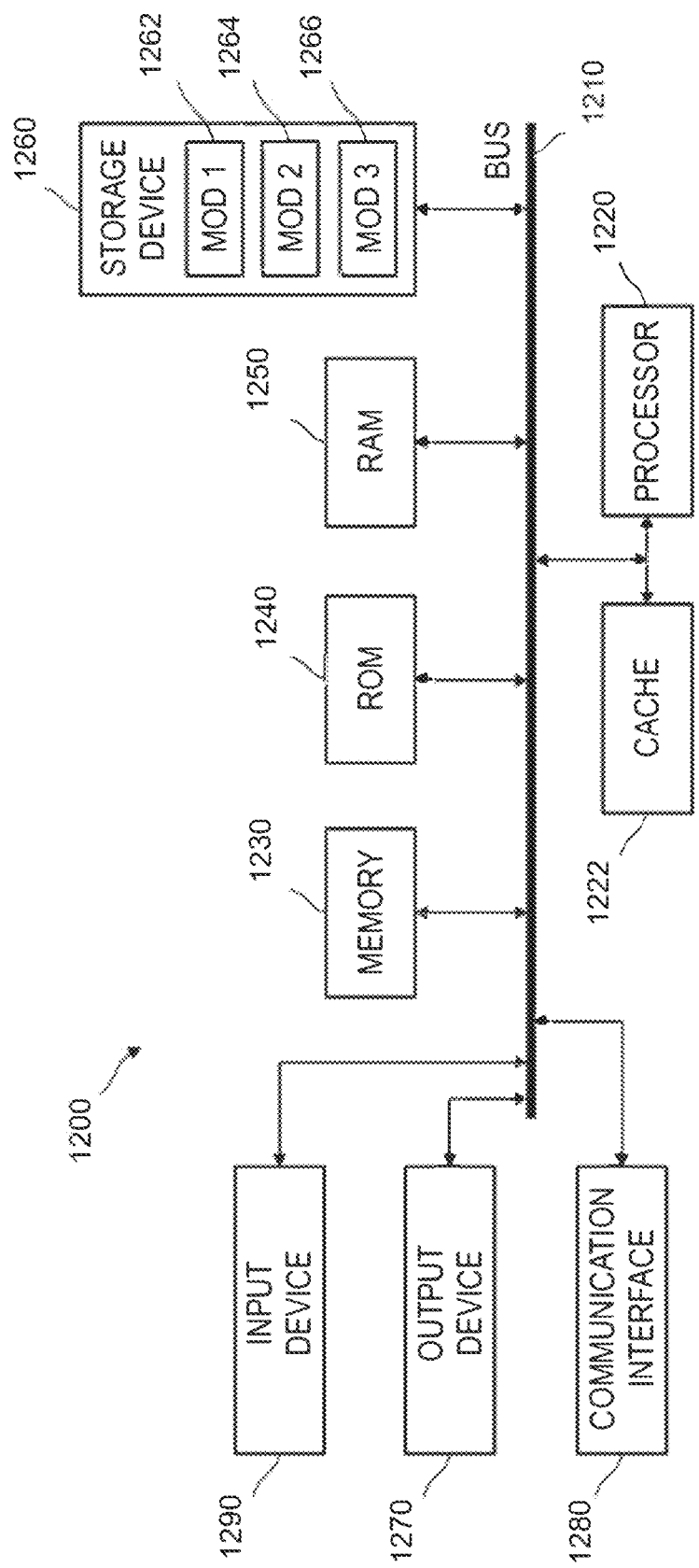
FIG. 12 illustrates a videoconferencing device, in accordance with an example of this disclosure.

FIG. 12 illustrates an electronic device 1200 (such as endpoint 10) which can be employed to practice the concepts and methods described above. The components disclosed herein can be incorporated in whole or in part into tablet computers, personal computers, handsets and other devices utilizing one or more microphones. As shown, device 1200 can include a processing unit (CPU or processor) 1220 and a system bus 1210. System bus 1210 interconnects various system components—including the system memory 1230 such as read only memory (ROM) 1240 and random-access memory (RAM) 1250—to the processor 1220. The processor 1220 can be a DSP. The device 1200 can include a cache 1222 of high-speed memory connected directly with, near, or integrated as part of the processor 1220. The device 1200 copies data from the memory 1230 and/or the storage device 1260 to the cache 1222 for quick access by the processor 1220. In this way, the cache provides a performance boost that avoids processor 1220 delays while waiting for data. These and other modules can control or be configured to control the processor 1220 to perform various actions. Other system memory 1230 may be available for use as well. The memory 1230 can include multiple different types of memory with different performance characteristics. The processor 1220 can include any general-purpose processor and a hardware module or software module, such as module 1 (1262), module 2 (1264), and module 3 (1266) stored in storage device 1260, configured to control the processor 1220 as well as a special-purpose processor where software instructions are incorporated into the actual processor design. The processor 1220 may essentially be a completely self-contained computing system, containing multiple cores or processors, a bus, memory controller, cache, etc. A multi-core processor may be symmetric or asymmetric.

The system bus 1210 may be any of several types of bus structures including a memory bus or memory controller, a peripheral bus, and a local bus using any of a variety of bus architectures. A basic input/output system (BIOS) stored in ROM 1240 or the like, may provide the basic routine that helps to transfer information between elements within the device 1200, such as during start-up. The device 1200 further includes storage devices 1260 such as a hard disk drive, a magnetic disk drive, an optical disk drive, tape drive or the like. The storage device 1260 can include software modules 1262, 1264, 1266 for controlling the processor 1220. Other hardware or software modules are contemplated. The storage device 1260 is connected to the system bus 1210 by a drive interface. The drives and the associated computer readable storage media provide nonvolatile storage of computer readable instructions, data structures, program modules and other data for the device 1200. In at least one example, a hardware module that performs a function includes the software component stored in a non-transitory computer-readable medium coupled to the hardware components—such as the processor 1220, bus 1210, output device 1270, communications interface 1280, input device 1290, and so forth—necessary to carry out the function.

For clarity of explanation, the device of FIG. 12 is presented as including individual functional blocks including functional blocks labeled as a "processor" or processor 1220. The functions these blocks represent may be provided using either shared or dedicated hardware, including, but not limited to, hardware capable of executing software and hardware, such as a processor 1220, that is purpose-built to operate as an equivalent to software executing on a general-purpose processor. For example, the functions of one or more processors presented in FIG. 12 may be provided by a single shared processor or multiple processors. (Use of the term "processor" should not be construed to refer exclusively to hardware capable of executing software.) One or more examples of this disclosure include microprocessor hardware, and/or digital signal processor (DSP) hardware, read-only memory (ROM) 1240 for storing software performing the operations discussed in one or more examples below, and random-access memory (RAM) 1250 for storing results. Very large-scale integration (VLSI) hardware embodiments, as well as custom VLSI circuitry in combination with a general-purpose DSP circuit can also be used.

Examples of this disclosure also include:

1. A method of establishing a genuine participant in a teleconference, comprising: capturing, using a first optical device, first image data corresponding to a first view; establishing, using a processor, a first facial region within the first view; determining, using the processor, a first plurality of facial elements corresponding to the first facial region; determining, using the processor, that the first plurality of facial elements forms a first plane; capturing, using a second optical device, second image data corresponding to a second view; establishing, using a processor, a second facial region within the second view; determining, using the processor, a second plurality of facial elements corresponding to the second facial region; determining, using the processor, that the second plurality of facial elements forms a second plane; determining, using the processor, that the first plane intersects with the second plane; determining, using the processor, that the second facial region corresponds to a genuine participant based, at least in part, on the determination that the first plane intersects with the second plane; and capturing, using the second optical device, third image data corresponding to the genuine participant.

2. The method of example 1, further comprising: establishing, using the processor, a polygon within the first view; and determining, using the processor, that the first facial region is at least partially bounded by the polygon, wherein determining a first plurality of facial elements corresponding to the first facial region is responsive to determining that the first facial region is at least partially bounded by the polygon.

3. The method of example 2, further comprising including the third image data in a video feed.

4. The method of example 1, wherein: determining, using the processor, that the first plurality of facial elements forms the first plane comprises determining a first rotational matrix corresponding to the first plurality of facial elements; determining, using the processor, that the second plurality of facial elements forms a second plane comprises determining a second rotational matrix corresponding to the second plurality of facial elements; and determining, using the processor, that the first plane intersects with the second plane, comprises calculating a degree of similarity between that the first rotational matrix and second rotational matrix, and determining that the degree of similarity falls below a predetermined threshold.

5. The method of example 1, wherein: the first plurality of facial elements comprises a first left-eye-point, a first right-eye-point, and a first nose-point; and the second plurality of facial elements comprises a second left-eye-point, a second right-eye-point, and a second nose-point.

6. The method of example 5, wherein: the second plurality of facial elements further comprises a left-corner-of-mouth point and a right-corner-of-mouth point. 7. The method of example 1, wherein: establishing, using the processor, the first facial region within the first view, comprises determining that the first facial region is non-static; and determining, using the processor, the first plurality of facial elements corresponding to the first facial region, is based, at least in part, on the determination that the first facial region is non-static.

8. The method of example 1, wherein the first optical device comprises a panoramic or wide view camera.

9. A videoconferencing endpoint, comprising: a communications interface; a first optical device and a second optical device; a processor coupled to the communications interface, the first optical device, and the second optical device; a memory storing instructions executable by the processor, wherein the instructions comprise instructions to: transmit, using the communications interface, a video feed to a remote endpoint; capture, using the first optical device, first image data corresponding to a first view; establish a first facial region within the first view; determine a first plurality of facial elements corresponding to the first facial region; determine that the first plurality of facial elements forms a first plane; capture, using the second optical device, second image data corresponding to a second view; establish a second facial region within the second view; determine a second plurality of facial elements corresponding to the second facial region; determine that the second plurality of facial elements forms a second plane; determine that the first plane is parallel with the second plane; determine that the second facial region corresponds to a rendered participant based, at least in part, on the determination that the first plane is parallel with the second plane; and preclude third image data corresponding to the rendered participant from inclusion in the video feed.

10. The videoconferencing endpoint of example 9, wherein the instructions further comprise instructions to: establish a polygon within the first view; and determine that the first facial region is at least partially bounded by the polygon, and wherein the instructions to determine the first plurality of facial elements corresponding to the first facial region further comprise instructions to determine the first plurality of facial elements corresponding to the first facial region further comprise instructions responsive to determining that the first facial region is at least partially bounded by the polygon.

11. The videoconferencing endpoint of example 10, wherein the instructions further comprise instructions to capture third image data using the first optical device and check for a presence of a third facial region. 12. The videoconferencing endpoint of example 9, wherein: the instructions to determine that the first plurality of facial elements forms the first plane comprise instructions to determine a first rotational matrix corresponding to the first plurality of facial elements; the instructions to determine that the second plurality of facial elements forms a second plane comprise instructions to determine a second rotational matrix corresponding to the second plurality of facial elements; and the instructions to determine that the first plane intersects with the second plane comprise instructions to calculate a degree of similarity between that the first rotational matrix and second rotational matrix determine that the degree of similarity falls meets a predetermined threshold.

12. The videoconferencing endpoint of example 9, wherein: the first plurality of facial elements comprises a first left-eye-point, a first right-eye-point, and a first nose-point; and the second plurality of facial elements comprises a second left-eye-point, a second right-eye-point, and a second nose-point.

13. The videoconferencing endpoint of example 12, wherein: the second plurality of facial elements further comprises a left-corner-of-mouth point and a right-corner-of-mouth point.

14. The videoconferencing endpoint of example 9, wherein: the instructions to establish the first facial region within the first view comprise instructions to determine that the first facial region is non-static; and the instructions to determine that first plurality of facial elements corresponds to the first facial region comprise instructions to determine that the first plurality of facial elements corresponds to the first facial region based, at least in part, on the determination that the first facial region is non-static.

15. The videoconferencing endpoint of example 9, wherein the first optical device comprises a panoramic or three-hundred and sixty-degree camera.

16. A non-transitory computer readable medium storing instructions executable by a processor, the instructions comprising instructions to: capture, using a first optical device, first image data corresponding to a first view; establish a first facial region within the first view; determine a first plurality of facial elements corresponding to the first facial region; determine that the first plurality of facial elements forms a first plane; capture, using a second optical device, second image data corresponding to a second view; establish a second facial region within the second view; determine a second plurality of facial elements corresponding to the second facial region; determine that the second plurality of facial elements forms a second plane; determine that the first plane intersects with the second plane; determine that the second facial region corresponds to a genuine participant based, at least in part, on the determination that the first plane intersects with the second plane; and capture using the second optical device, third image data corresponding to the genuine participant.

17. The non-transitory computer readable medium of example 16, the instructions further comprising instructions to: establish a polygon within the first view; and determine that the first facial region is at least partially bounded by the polygon, determine the first plurality of facial elements corresponding to the first facial region, responsive to determining that the first facial region is at least partially bounded by the polygon.

18. The non-transitory computer readable medium of example 17, the instructions further comprising instructions to transmit the third image data to a remote endpoint using a communications interface.

19. The non-transitory computer readable medium of example 16, the instructions to determine that the first plurality of facial elements forms a first plane comprising instructions to determine a first rotational matrix corresponding to the first plurality of facial elements; the instructions to determine that the second plurality of facial elements forms a second plane comprising instructions to determine a second rotational matrix corresponding to the second plurality of facial elements; and the instructions to determine that the first plane intersects with the second plane, comprising instructions to calculate a degree of similarity between that the first rotational matrix and second rotational matrix and determine that the degree of similarity falls below a predetermined threshold.

20. The non-transitory computer readable medium of example 16, wherein: the first plurality of facial elements comprises a first left-eye-point, a first right-eye-point, and a first nose-point; and the second plurality of facial elements comprises a second left-eye-point, a second right-eye-point, and a second nose-point.

The various examples described above are provided by way of illustration only—and should not be construed to limit the scope of the disclosure. Various modifications and changes can be made to the principles and examples described herein without departing from the scope of the disclosure and without departing from the claims which follow.

The invention claimed is:

1. A method of differentiating a rendering of a teleconference participant from a genuine teleconference participant, comprising:
    capturing, using a first optical device coupled to a processor, first image data corresponding to a first view;
    establishing, using the processor, a first facial region within the first view;
    determining, using the processor, a first cluster of facial feature points corresponding to the first facial region;
    capturing, using a second optical device coupled to the processor, second image data corresponding to a second view;
    establishing, using the processor, a second facial region within the second view;
    determining, using the processor, a second cluster of facial feature points corresponding to the second facial region;
    comparing, using the processor, the first cluster of facial feature points with the second cluster of facial feature points;
    determining that the first cluster of facial feature points and the second cluster of facial feature points correspond to a rendered participant when a degree of similarity between the first cluster of facial feature points and the second cluster of facial feature points satisfies a first threshold; and
    determining that the first cluster of facial feature points and the second cluster of facial feature points correspond to a genuine participant when the degree of similarity between the first cluster of facial feature points and the second cluster of facial feature points is below a second threshold.

2. The method of claim 1, wherein the second threshold is different from the first threshold.

3. The method of claim 1, further comprising transmitting, through a network interface coupled to the processor, third image data corresponding to the genuine participant, responsive to determining that the first cluster of facial feature points and the second cluster of facial feature points correspond to the genuine participant.

4. The method of claim 1, further comprising:
    establishing, using the processor, a four-sided polygon within the first view; and
    determining, using the processor, that the first facial region is at least partially bounded by the four-sided polygon,
    wherein determining the first cluster of facial feature points corresponding to the first facial region is responsive to determining that the first facial region is at least partially bounded by the four-sided polygon.

5. The method of claim 1, wherein:
the first cluster of facial feature points comprises a first left-corner-of-mouth point and a first right-corner-of-mouth point; and
the second cluster of facial feature points comprises a second left-corner-of-mouth point and a second right-corner-of-mouth point.

6. The method of claim 5, wherein:
the first cluster of facial feature points further comprises a first left-eye-point, a first right-eye-point, and a first nose-point; and
the second cluster of facial feature points further comprises a second left-eye-point, a second right-eye-point, and a second nose-point.

7. The method of claim 1, wherein comparing, using the processor, the first cluster of facial feature points with the second cluster of facial feature points comprises determining distances between two or more facial feature points of the first cluster of facial feature points and determining distances between two or more facial feature points within the second cluster of facial feature points.

8. The method of claim 1, wherein the first threshold is an eighty-five percent degree of similarity.

9. A videoconferencing endpoint, comprising:
a first optical device and a second optical device;
a processor coupled to the first optical device, and the second optical device; and
a memory storing instructions executable by the processor, wherein the instructions comprise instructions to:
capture, using the first optical device, first image data corresponding to a first view;
establish a first facial region within the first view;
determine a first cluster of facial feature points corresponding to the first facial region;
capture, using the second optical device, second image data corresponding to a second view;
establish a second facial region within the second view;
determine a second cluster of facial feature points corresponding to the second facial region;
compare the first cluster of facial feature points with the second cluster of facial feature points;
determine that the first cluster of facial feature points and the second cluster of facial feature points correspond to a rendered participant when a degree of similarity between the first cluster of facial feature points and the second cluster of facial feature points satisfies a first threshold; and
determine that the first cluster of facial feature points and the second cluster of facial feature points correspond to a genuine participant when the degree of similarity between the first cluster of facial feature points and the second cluster of facial feature points is below a second threshold.

10. The videoconferencing endpoint of claim 9, wherein the second threshold is the same as the first threshold.

11. The videoconferencing endpoint of claim 9, wherein the instructions further comprise instructions to transmit, through a network interface coupled to the processor, third image data corresponding to the genuine participant, responsive to determining that the first cluster of facial feature points and the second cluster of facial feature points correspond to the genuine participant.

12. The videoconferencing endpoint of claim 9, wherein the instructions further comprise instructions to:
establish a four-sided polygon within the first view; and
determine that the first facial region is at least partially bounded by the four-sided polygon, and
wherein the instructions to determine the first cluster of facial feature points corresponding to the first facial region comprise instructions to determine the first cluster of facial feature points responsive to determining that the first facial region is at least partially bounded by the four-sided polygon.

13. The videoconferencing endpoint of claim 9, wherein:
the first cluster of facial feature points comprises a first left-corner-of-mouth point and a first right-corner-of-mouth point; and
the second cluster of facial feature points comprises a second left-corner-of-mouth point and a second right-corner-of-mouth point.

14. The videoconferencing endpoint of claim 13, wherein:
the first cluster of facial feature points further comprises a first left-eye-point, a first right-eye-point, and a first nose-point; and
the second cluster of facial feature points further comprises a second left-eye-point, a second right-eye-point, and a second nose-point.

15. The videoconferencing endpoint of claim 9, wherein the instructions to compare the first cluster of facial feature points with the second cluster of facial feature points comprise instructions to determine distances between two or more facial feature points of the first cluster of facial feature points and determine distances between two or more facial feature points within the second cluster of facial feature points.

16. The videoconferencing endpoint of claim 9, wherein the first threshold is an eighty-five percent degree of similarity.

17. A non-transitory computer readable medium storing instructions executable by a processor, wherein the instructions comprising instructions to:
capture, using a first optical device, first image data corresponding to a first view;
establish a first facial region within the first view;
determine a first cluster of facial feature points corresponding to the first facial region;
capture, using a second optical device, second image data corresponding to a second view;
establish a second facial region within the second view;
determine a second cluster of facial feature points corresponding to the second facial region;
compare the first cluster of facial feature points with the second cluster of facial feature points;
determine that the first cluster of facial feature points and the second cluster of facial feature points correspond to a rendered participant when a degree of similarity between the first cluster of facial feature points and the second cluster of facial feature points satisfies a first threshold; and
determine that the first cluster of facial feature points and the second cluster of facial feature points correspond to a genuine participant when the degree of similarity between the first cluster of facial feature points and the second cluster of facial feature points is below a second threshold.

18. The non-transitory computer readable medium of claim 17, wherein the instructions further comprise instructions to render, using a display device coupled to the processor, third image data corresponding to the genuine participant, responsive to determining that the first cluster of facial feature points and the second cluster of facial feature points correspond to the genuine participant.

19. The non-transitory computer readable medium of claim 17, wherein the instructions further comprise instructions to:

establish a rectangular polygon within the first view; and determine that the first facial region is at least partially bounded by the rectangular polygon, and wherein the instructions to determine the first cluster of facial feature points corresponding to the first facial region comprise instructions to determine the first cluster of facial feature points responsive to determining that the first facial region is at least partially bounded by the rectangular polygon.

20. The non-transitory computer readable medium of claim 17, wherein the instructions to compare the first cluster of facial feature points with the second cluster of facial feature points comprise instructions to determine distances between two or more facial feature points of the first cluster of facial feature points and determine distances between two or more corresponding facial feature points within the second cluster of facial feature points.

\* \* \* \* \*